United States Patent
Kim et al.

(10) Patent No.: US 11,418,379 B2
(45) Date of Patent: Aug. 16, 2022

(54) METHOD FOR TRANSMITTING/RECEIVING REFERENCE SIGNAL IN WIRELESS COMMUNICATION SYSTEM, AND DEVICE THEREFOR

(71) Applicant: LG ELECTRONICS INC., Seoul (KR)

(72) Inventors: Kyuseok Kim, Seoul (KR); Jiwon Kang, Seoul (KR); Hyunsoo Ko, Seoul (KR); Kijun Kim, Seoul (KR); Seonwook Kim, Seoul (KR); Hyungtae Kim, Seoul (KR); Minki Ahn, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 16/620,866

(22) PCT Filed: Jan. 23, 2018

(86) PCT No.: PCT/KR2018/001030
§ 371 (c)(1),
(2) Date: Dec. 9, 2019

(87) PCT Pub. No.: WO2018/225927
PCT Pub. Date: Dec. 13, 2018

(65) Prior Publication Data
US 2020/0204335 A1    Jun. 25, 2020

Related U.S. Application Data

(60) Provisional application No. 62/517,210, filed on Jun. 9, 2017.

(51) Int. Cl.
*H04L 27/26* (2006.01)
*H04L 5/00* (2006.01)
(Continued)

(52) U.S. Cl.
CPC ........ *H04L 27/2675* (2013.01); *H04L 1/0006* (2013.01); *H04L 5/005* (2013.01);
(Continued)

(58) Field of Classification Search
None
See application file for complete search history.

(56) References Cited

U.S. PATENT DOCUMENTS

| | | | |
|---|---|---|---|
| 8,995,592 B2* | 3/2015 | Dao | H04W 72/042 455/39 |
| 2010/0296465 A1* | 11/2010 | Hooli | H04L 5/0037 370/329 |

(Continued)

FOREIGN PATENT DOCUMENTS

| | | |
|---|---|---|
| CN | 104488213 | 4/2015 |
| CN | 105122871 | 12/2015 |
| WO | 2016010379 | 1/2016 |

OTHER PUBLICATIONS

Ericsson, "On DL and UL phase noise tracking RS (PTRS)," 3GPP TSG-RAN WG1 #87ah-NR, R1-1701161, Jan. 2017, 9 pages.
(Continued)

*Primary Examiner* — Andrew C Oh
(74) *Attorney, Agent, or Firm* — Lee Hong Degerman Kang Waimey

(57) ABSTRACT

The present disclosure relates to a method and a device for a terminal performing decoding in a wireless communication system. According to the present disclosure, a method and a device may be provided, the method comprising a step for receiving a first demodulation reference signal (DMRS) and a second DMRS configured according to particular patterns from a base station via DMRS symbols, wherein the first DMRS and the second DMRS are respectively transmitted on particular antenna ports and are positioned on the same time axial symbol as that of at least one other DMRS (Continued)

transmitted on another antenna port, and the position of the time axial symbol of the second DMRS is determined according to a slot format or the last symbol on which downlink data is transmitted, and data is decoded using at least one of the first DMRS or the second DMRS.

18 Claims, 20 Drawing Sheets

(51) Int. Cl.
*H04L 1/00* (2006.01)
*H04L 5/10* (2006.01)
*H04L 25/03* (2006.01)

(52) U.S. Cl.
CPC .......... *H04L 5/0007* (2013.01); *H04L 5/0051* (2013.01); *H04L 5/0082* (2013.01); *H04L 5/0094* (2013.01); *H04L 5/10* (2013.01); *H04L 25/03006* (2013.01); *H04L 27/2646* (2013.01); *H04L 2025/03796* (2013.01)

(56) References Cited

U.S. PATENT DOCUMENTS

| | | | | |
|---|---|---|---|---|
| 2011/0019776 | A1* | 1/2011 | Zhang | H04L 5/0023 375/340 |
| 2013/0039332 | A1* | 2/2013 | Nazar | H04B 7/0452 370/330 |
| 2013/0114756 | A1* | 5/2013 | Jia | H04L 5/0048 375/295 |
| 2013/0194931 | A1* | 8/2013 | Lee | H04W 72/04 370/329 |
| 2014/0146765 | A1* | 5/2014 | Ji | H04W 72/082 370/329 |
| 2014/0269249 | A1* | 9/2014 | Bai | H04L 27/2636 370/204 |
| 2014/0314000 | A1 | 10/2014 | Liu et al. | |
| 2015/0029969 | A1 | 1/2015 | Park et al. | |
| 2015/0230211 | A1* | 8/2015 | You | H04W 72/04 370/330 |
| 2015/0280876 | A1* | 10/2015 | You | H04L 27/2602 370/329 |
| 2015/0289236 | A1* | 10/2015 | Seo | H04L 1/0046 370/335 |
| 2016/0073415 | A1* | 3/2016 | Rahman | H04L 25/0228 370/329 |
| 2016/0081107 | A1* | 3/2016 | Yang | H04W 72/042 370/280 |
| 2016/0164588 | A1* | 6/2016 | Chen | H04B 7/0626 375/267 |
| 2017/0013565 | A1* | 1/2017 | Pelletier | H04W 52/367 |
| 2017/0019915 | A1* | 1/2017 | Nogami | H04L 69/22 |
| 2017/0078006 | A1* | 3/2017 | Liu | H04L 5/0051 |
| 2017/0094657 | A1* | 3/2017 | Yoon | H04W 72/0446 |
| 2017/0207932 | A1 | 7/2017 | Kim et al. | |
| 2017/0215188 | A1* | 7/2017 | Kim | H04L 5/0091 |
| 2017/0257860 | A1* | 9/2017 | Nam | H04W 72/0413 |
| 2017/0264408 | A1* | 9/2017 | Patel | H04L 5/0051 |
| 2017/0272214 | A1* | 9/2017 | Chen | H04L 5/0051 |
| 2017/0280479 | A1* | 9/2017 | Frenne | H04W 48/02 |
| 2017/0288835 | A1* | 10/2017 | Kim | H04W 72/042 |
| 2017/0367046 | A1* | 12/2017 | Papasakellariou | H04L 5/0048 |
| 2018/0176043 | A1* | 6/2018 | Kim | H04L 27/2602 |
| 2018/0213563 | A1* | 7/2018 | Yang | H04W 72/044 |
| 2018/0294935 | A1* | 10/2018 | Uchiyama | H04W 72/0406 |
| 2018/0323923 | A1* | 11/2018 | Wang | H04J 11/0073 |
| 2018/0343577 | A1* | 11/2018 | Takiguchi | H04W 72/04 |
| 2018/0359044 | A1* | 12/2018 | Pirskanen | H04B 7/0617 |
| 2018/0367277 | A1 | 12/2018 | Zhang et al. | |
| 2019/0013912 | A1* | 1/2019 | Tomeba | H04L 5/0053 |
| 2019/0029046 | A1* | 1/2019 | Li | H04L 5/0094 |
| 2019/0036658 | A1* | 1/2019 | Kim | H04L 5/005 |
| 2019/0037483 | A1* | 1/2019 | Li | H04L 25/0224 |
| 2019/0069312 | A1* | 2/2019 | Oh | H04L 5/0053 |
| 2019/0081744 | A1* | 3/2019 | Yang | H04W 72/0413 |
| 2019/0140806 | A1* | 5/2019 | Andersson | H04L 27/2666 |
| 2019/0387504 | A1* | 12/2019 | Jung | H04L 5/0053 |
| 2020/0008102 | A1 | 1/2020 | Yokomakura et al. | |
| 2020/0028647 | A1* | 1/2020 | Kim | H04L 5/0016 |
| 2020/0266963 | A1* | 8/2020 | Song | H04L 5/10 |

OTHER PUBLICATIONS

ZTE, "Discussion on RS for phase tracking," 3GPP TSG-RAN WG1 #89, R1-1707132, May 2017, 11 pages.
Ericsson, "Summary of PTRS open issues and companies view," 3GPP TSG-RAN WG1 #89, R1-1707803, May 2017, 6 pages.
LG Electronics, "On DL PT-RS Design," 3GPP TSG-RAN WG1 #88bis, R1-1704890, Apr. 2017, 3 pages.
Nokia, "DL DMRS patterns link performance evaluation," 3GPP TSG-RAN WG1 NR Ad-Hoc Meeting, R1-1701104, Jan. 2017, 11 pages.
Ericsson, "On PTRS design," 3GPP TSG-RAN WG1 #88, R1-1703220, Feb. 2017, 4 pages.
CATT, "Discussion on DMRS design for DL," 3GPP TSG-RAN WG1 #88bis, R1-1704561, Apr. 2017, 7 pages.
CATT, "Further discussion on RS for phase tracking," 3GPP TSG-RAN WG1 #88, R1-1702088, Feb. 2017, 5 pages.
PCT International Application No. PCT/KR2018/002884, International Search Report dated Jun. 22, 2018, 5 pages.
European Patent Office Application Serial No. 18813448.0, Search Report dated Feb. 20, 2019, 12 pages.
United States Patent and Trademark Office U.S. Appl. No. 16/064,398, Office Action dated May 15, 2020, 19 pages.
PCT International Application No. PCT/KR2018/001030, International Search Report dated May 11, 2018, 4 pages.
Vivo, "On DL DMRS design for NR", 3GPP TSG RAN WG1 Meeting #89, R1-1707247, May 2017, 5 pages.
Zte, "Discussion on downlink DMRS design", 3GPP TSG RAN WG1 Meeting #89, R1-1707130, May 2017, 11 pages.
Interdigital, "On DM-RS design for NR", 3GPP TSG RAN WG1 Meeting #89, R1-1708341, May 2017, 4 pages.
NEC, "Considerations on the sequence design of DMRS", 3GPP TSG RAN WG1 Meeting #89, R1-1707811, May 2017, 3 pages.
The State Intellectual Property Office of the People's Republic of China Application Serial No. 201880002993.2, Office Action dated Dec. 2, 2020, 8 pages.
LG Electronics, "On UL PT-RS design," 3GPP TSG-RAN WG1 #89, R1-1707617, May 2017, 8 pages.
AT&T, "Design of DM-RS for NR MIMO," 3GPP TSG-RAN WG1 NR Ad-Hoc Meeting, R1-1700316, Jan. 2017, 2 pages.
Qualcomm Incorporated, "Discussion on DL DMRS design," 3GPP TSG-RAN WG1 #88bis, R1-1705591, Apr. 2017, 10 pages.
3rd Generation Partnership Project (3GPP), "Technical Specification Group Radio Access Network; Study on New Radio Access Technology (Release 14)," 3GPP TR 38.912 V0.1.0, R1-1700591, Jan. 2017, 24 pages.
Ericsson, "On transmission parameter sets," 3GPP TSG-RAN WG1 #89, R1-1708675, May 2017, 4 pages.
Japan Patent Office Application Serial No. 2019-534790, Office Action dated Sep. 9, 2020, 10 pages.
European Patent Office Application Serial No. 18813448.0, Office Action dated Oct. 22, 2020, 9 pages.
The State Intellectual Property Office of the People's Republic of China Application Serial No. 201880002993.2, Office Action dated Jun. 10, 2021, 6 pages.
Nokia, et al., "On the DL DMRS structure for NR physical data channels", R1-1703180, 3GPP TSG RAN WG1#88, Feb. 2017, 7 pages.
Vivo, "Discussion on PTRS design", R1-1707248, 3GPP TSG RAN WG1 Meeting #89, May 2017, 6 pages.

* cited by examiner (a)

(b)

(a)

(b)

(a)

(b)

(a)

(b)

(a)

(b)

(a)

(b)

(c)

METHOD FOR TRANSMITTING/RECEIVING REFERENCE SIGNAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2018/001030, filed on Jan. 23, 2018, which claims the benefit of U.S. Provisional Application No. 62/517,210, filed on Jun. 9, 2017, the contents of which are all hereby incorporated by reference herein in their entirety.

TECHNICAL FIELD

The present disclosure relates to a wireless communication system, and more particularly, to a method and an apparatus for generating and transmitting and receiving a demodulation reference signal (DMRS) for decoding data in a wireless communication system.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

The present disclosure has been made in an effort to provide a method and a device for generating and transmitting/receiving a Demodulation Reference Signal (DMRS) for decoding data.

Furthermore, the present disclosure has been made in an effort to provide a method and a device for generating and transmitting/receiving a DMRS for a Common Phase Error (CPE)/Carrier Frequency Offset (CFO) value due to a Doppler Effect.

Furthermore, the present disclosure has been made in an effort to provide a method and a device for mapping an additional DMRS for channel estimation to a resource block in a High Doppler environment.

Furthermore, the present disclosure has been made in an effort to provide a method and a device for configuring a DMRS and an additional DMRS in a time domain and a frequency domain in order to reduce RS overhead when transmitting the additional DMRS.

Furthermore, the present disclosure has been made in an effort to provide a method and a device for adjusting densities of the DMRS and the additional DMRS mapped to the time domain and the frequency domain.

Furthermore, the present disclosure has been made in an effort to provide a method and a device for accurately decoding a received signal by improving a phase noise estimating process of a UE in a wireless communication system.

Furthermore, the present disclosure invention has been made in an effort to provide a method and a device for reducing overhead in transmitting a signal for estimating phase noise.

Furthermore, the present disclosure invention has been made in an effort to provide a method and a device for mapping a phase tracking reference signal for estimating the phase noise to a resource block.

The technical objects of the present disclosure are not limited to the aforementioned technical objects, and other technical objects, which are not mentioned above, will be apparently appreciated by a person having ordinary skill in the art from the following description.

Technical Solution

Specifically, according to an embodiment of the present disclosure, a method for performing, by a terminal, decoding in a wireless communication system includes: receiving a first demodulation reference signal (DMRS) and a second DMRS configured according to particular patterns from a base station via DMRS symbols, in which the first DMRS and the second DMRS are respectively transmitted on particular antenna ports and are positioned on the same time axial symbol as that of at least one other DMRS transmitted on another antenna port, and the position of the time axial symbol of the second DMRS is determined according to a slot format or the last symbol on which downlink data is transmitted; and decoding the data by using at least one of the first DMRS or the second DMRS.

Furthermore, in the present disclosure, the second DMRS is configured according to a first value indicating the number of first symbols for inter-symbol interference and a second value indicating the number of second symbols for transmitting control information of uplink data.

Furthermore, in the present disclosure, when the sum of the first value and the second value is larger than a specific value, the second DMRS is not configured.

Furthermore, in the present disclosure, when the sum of the first value and the second value is smaller than the specific value, the second DMRS is configured in the time axial symbol.

Furthermore, in the present disclosure, in a subframe in which the first DMRS and the second DMRS are configured, resources for uplink and downlink are configured.

Furthermore, in the present disclosure, the method further includes receiving, from the base station control information for receiving the downlink data, in which the control information includes format information indicating the slot format and positional information indicating the position of the last symbol.

Furthermore, in the present disclosure, the method further includes receiving, from the base station, a signal indicating the position of the time axial symbol.

Furthermore, in the present disclosure, the position of the time axial symbol is configured in the base station and the terminal according to a preconfigured specific value, and the specific value is configured according to a first symbol for inter-symbol interference and a second symbol for transmitting the uplink data.

Furthermore, the present disclosure provides a method for transmitting, by a terminal, a reference signal in a wireless communication system, including: generating a demodulation reference signal (DMRS) sequence; mapping the generated DMRS sequence to a resource block, in which the DMRS sequence is mapped on the same time axial symbol and each transmitted on a specific antenna port, and the position of the time axial symbol to which the DMRS is mapped is determined according to a slot format or the last symbol on which downlink data is transmitted; and transmitting, to a base station, the mapped DMRS sequence by using different antenna ports.

Furthermore, in the present disclosure, in the resource block, the position of a time axial symbol is hopped according to a frequency and the position of the time axial symbol is changed for each resource block.

Furthermore, the present disclosure provides a terminal performing decoding in a wireless communication system, including: a radio frequency (RF) unit transmitting and receiving a radio signal to and from the outside; and a processor functionally coupled with the communication unit, in which the processor is configured to receive a first demodulation reference signal (DMRS) and a second DMRS configured according to particular patterns from a base station via DMRS symbols, the first DMRS and the second DMRS are respectively transmitted on particular antenna ports and are positioned on the same time axial symbol as that of at least one other DMRS transmitted on another antenna port, and the position of the time axial symbol of the second DMRS is determined according to a slot format or the last symbol on which downlink data is transmitted, and decode the data by using at least one of the first DMRS or the second DMRS.

Advantageous Effects

According to the present disclosure, there is an effect that data can be decoded by estimating Common Phase Error (CPE) and Carrier Frequency Offset (CFO) values due to a Doppler Effect through a DMRS.

Furthermore, according to the present disclosure, there is an effect that a channel can be estimated through an additional DMRS in a High Doppler environment.

Furthermore, according to the present disclosure, there is an effect that the DMRS and the additional DMRS are mapped to a resource region according to characteristics of a service to satisfy a requirement of the service.

Furthermore, according to the present disclosure, there is an effect that RS overhead can be reduced by adjusting densities of the DMRS and the additional DMRS when transmitting the additional DMRS.

Furthermore, according to the present disclosure, a location of the additional DMRS is determined according to a slot structure to enhance channel estimation performance.

Furthermore, according to the present disclosure, there is an effect that phase noise can be removed by estimating Common Phase Error (CPE) and Carrier Frequency Offset (CFO) values through a PTRS.

Furthermore, according to the present disclosure, overhead due to transmission of a reference signal by determining a mapping pattern of the PTRS according to the density of the additional DMRS.

Advantages which can be obtained in the present disclosure are not limited to the aforementioned advantages and other unmentioned advantages will be clearly understood by those skilled in the art from the following description.

DESCRIPTION OF DRAWINGS

In order to help understanding of the present disclosure, the accompanying drawings which are included as a part of the Detailed Description provide embodiments of the present disclosure and describe the technical features of the present disclosure together with the Detailed Description.

MODE FOR INVENTION

Figure 1:
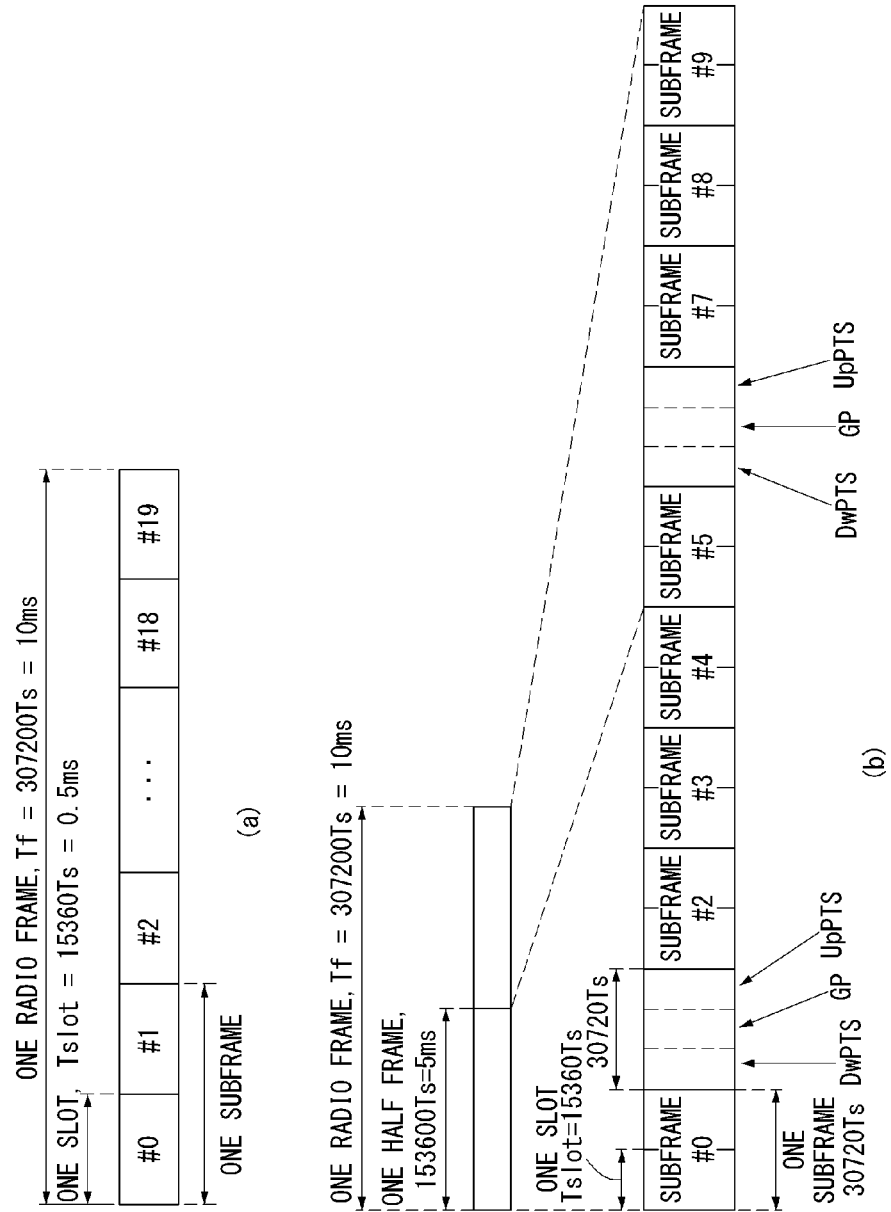
FIG. 1 is a diagram illustrating a structure of a radio frame in a wireless communication system to which the present disclosure may be applied.

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure.

However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In the present disclosure, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

General System to which the Present Disclosure May be Applied

FIG. 1 shows the structure of a radio frame in a wireless communication system to which an embodiment of the present disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 's' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot $2i$ and slot $2i+1$ of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half-frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

The structure of a radio subframe according to the example of FIG. 1 is just an example, and the number of subcarriers included in a radio frame, the number of slots included in a subframe and the number of OFDM symbols included in a slot may be changed in various manners.

Figure 2:
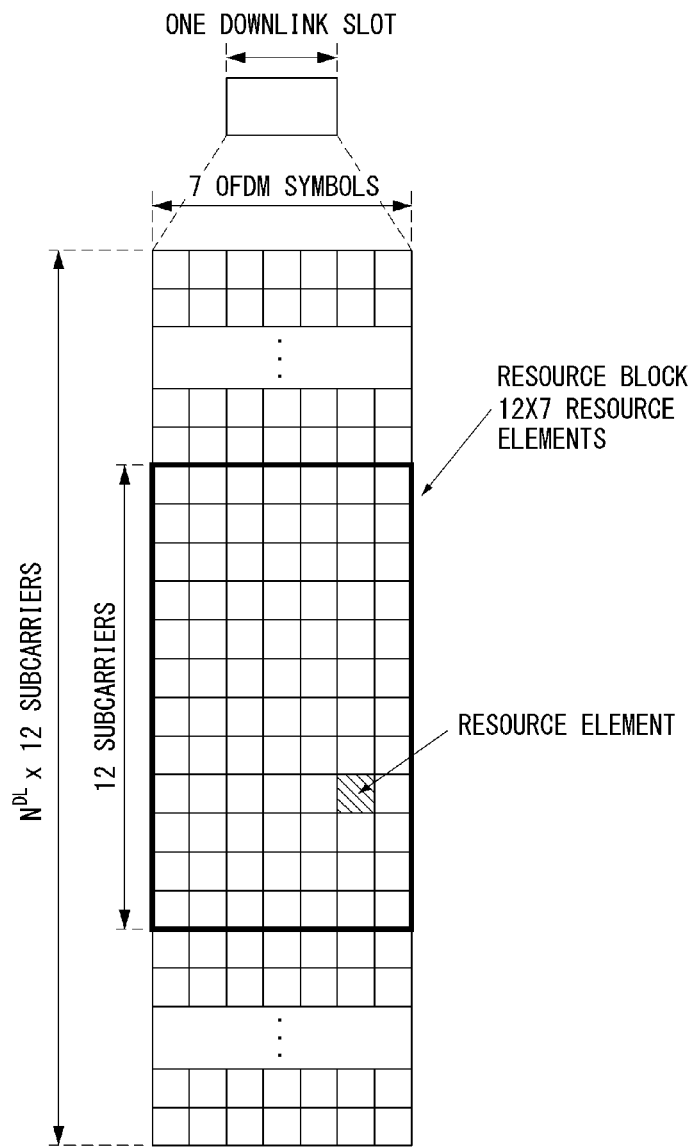
FIG. 2 is a diagram exemplifying a resource grid for one downlink slot in the wireless communication system to which the present disclosure may be applied.

FIG. 2 is a diagram illustrating a resource grid for one downlink slot in a wireless communication system to which an embodiment of the present disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present disclosure is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
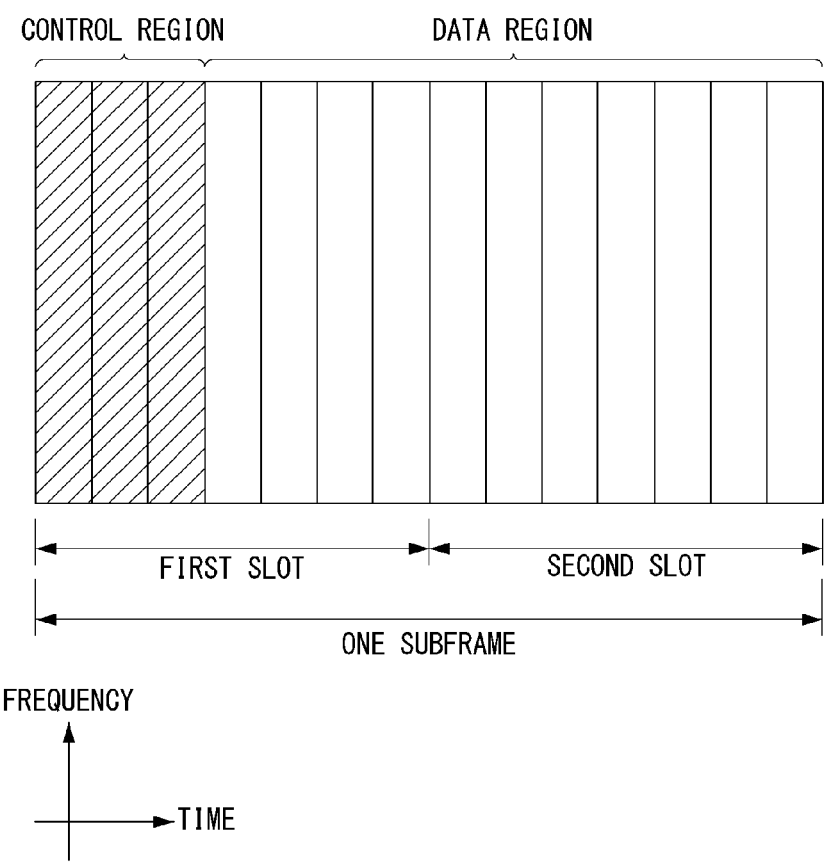
FIG. 3 is a diagram illustrating the structure of a downlink subframe in the wireless communication system to which the present disclosure may be applied.

FIG. 3 shows the structure of a downlink subframe in a wireless communication system to which an embodiment of the present disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — | allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (this is called a Radio Network Temporary Identifier (RNTI)) is masked to the CRC depending on the owner or use of a PDCCH. In the case that the PDCCH is a PDCCH for specific UE, an identifier unique to the UE, for example, a Cell-RNTI (C-RNTI) may be masked to the CRC. Or, in the case that the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
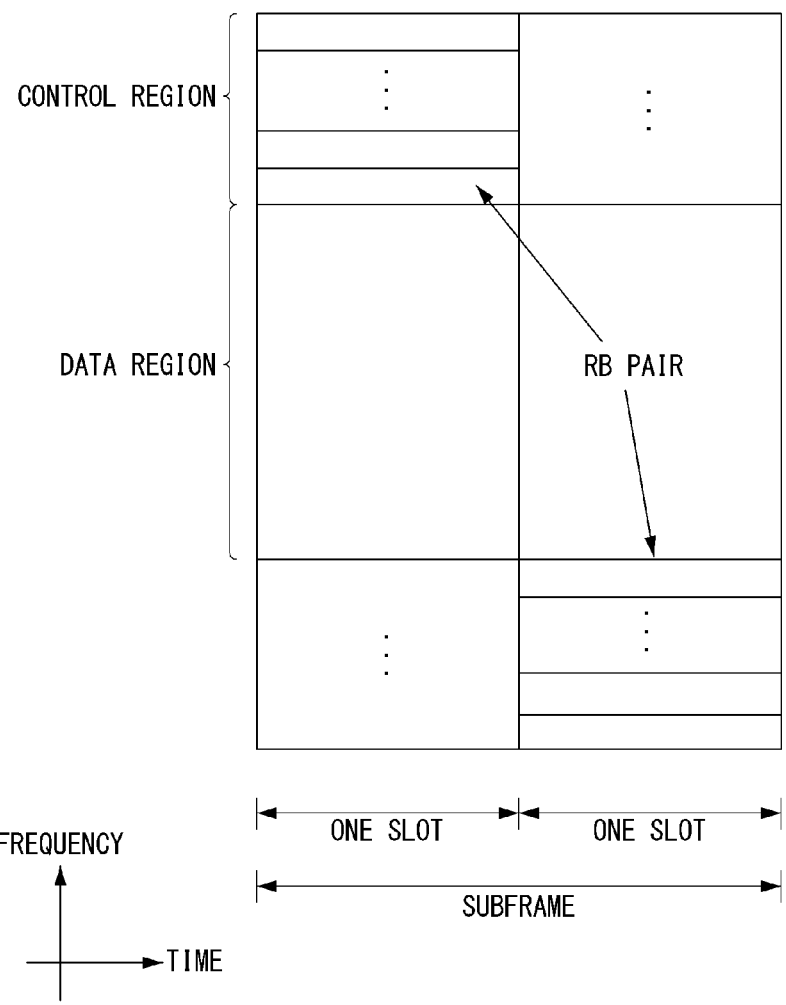
FIG. 4 is a diagram illustrating the structure of an uplink subframe in the wireless communication system to which the present disclosure may be applied.

FIG. 4 shows the structure of an uplink subframe in a wireless communication system to which an embodiment of the present disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement may be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 5:
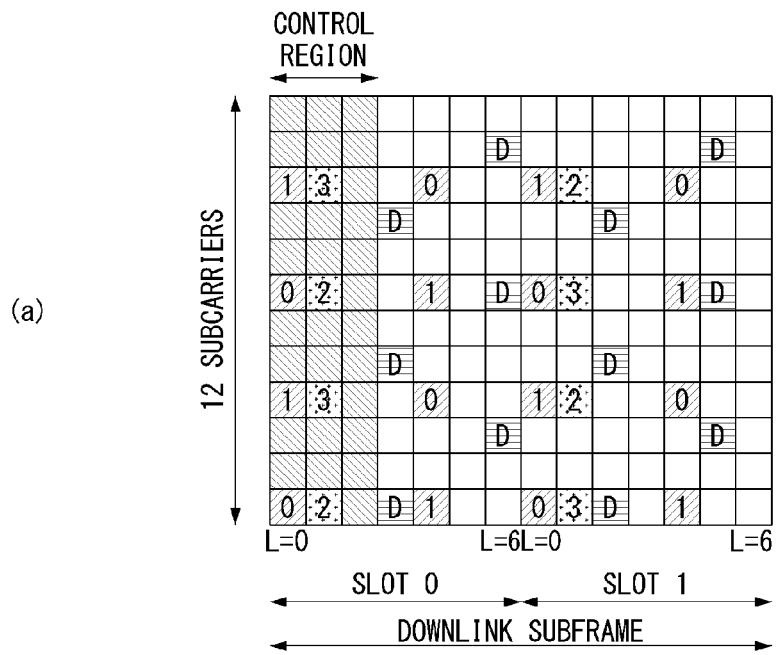
FIG. 5 is a diagram illustrating one example of a reference signal pattern mapped to a downlink resource block pair in the wireless communication system to which the present disclosure may be applied.
Figure 5:
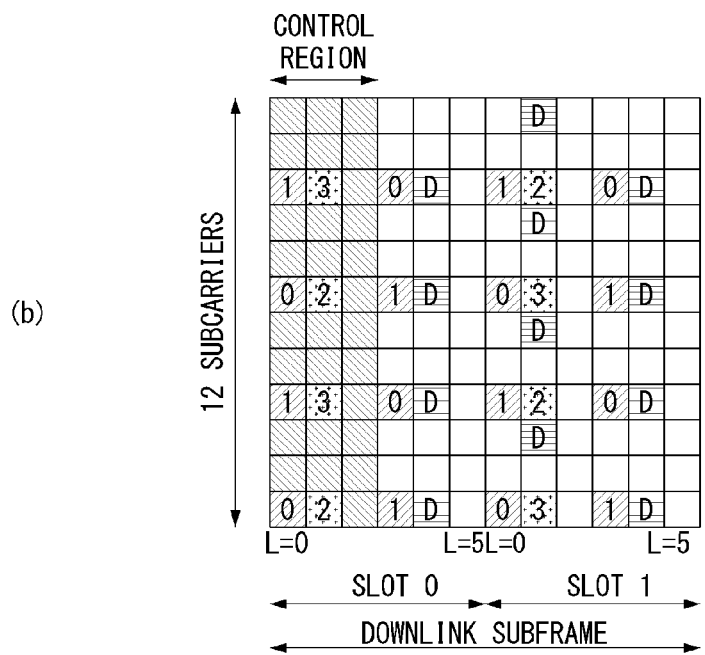

FIG. 5 illustrates reference signal patterns mapped to downlink resource block pairs in a wireless communication system to which the present disclosure may be applied.

Referring to FIG. 5, a downlink resource block pair, that is, a unit in which a reference signal is mapped, may be represented in the form of one subframe in a time domain× 12 subcarriers in a frequency domain. That is, in a time axis (an x axis), one resource block pair has a length of 14 OFDM symbols in the case of a normal cyclic prefix (CP) (FIG. 5a) and has a length of 12 OFDM symbols in the case of an extended cyclic prefix (CP) (FIG. 5b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, in the case that the number of transmission antennas of an eNB is two, CRSs for a No. 0 antenna port and a No. 1 antenna port are transmitted. In the case that the number of transmission antennas of an eNB is four, CRSs for No. 0 to No. 3 antenna ports are transmitted.

In the case that an eNB uses a single transmission antenna, reference signals for a single antenna port are arrayed.

In the case that an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, in the case that an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

In the case that a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

The rule of mapping a CRS to a resource block is defined as below.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink, ns represents a slot index and, $N_{ID}^{cell}$ represents a cell ID. The mod represents an modulo operation. The position of the reference signal varies depending on the vshift value in the frequency domain. Since vshift is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific UE in the MIMO antenna transmission is used without a change in order to estimate a channel associated with and corresponding to a transmission channel transmitted in each transmitting antenna when the terminal receives the reference signal.

The 3GPP LTE system (e.g., release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 3 shows the case of the extended CP.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

-continued $$k = (k') \bmod N_{sc}^{RB} + N_{sc}^{RB} \cdot n_{PRB} \quad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 3 and 4, k and 1 represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks.

$N_{RB}^{PDSCH}$ represents a frequency band of the resource block for the PDSCH transmission. ns represents the slot index and $N_{ID}^{cell}$ represents the cell ID. The mod represents the modulo operation. The position of the reference signal varies depending on the value in the frequency domain. Since $v_{shift}$ is subordinated to the cell ID, the position of the reference signal has various frequency shift values according to the cell.

In an LTE-A system of an evolved form of the LTE system, the design needs to be performed to support a maximum of 8 transmission antennas in the downlink of a base station. Accordingly, an RS for the maximum of 8 transmission antennas must be also supported. In the LTE system, only a downlink RS for a maximum of 4 antenna ports has been defined. In the case that a base station has 4 or a maximum of 8 downlink transmission antennas in the LTE-A system, an RS for such antenna ports needs to be additionally defined and designed. Regarding the RS for a maximum of 8 transmission antenna ports, both the above-described RS for channel measurement and the above-described RS for data demodulation must be designed.

One of important considerations in designing an LTE-A system is backward compatibility. That is, an LTE user equipment must well operate in the LTE-A system without any difficulty, and the system must support this. From a viewpoint of RS transmission, an RS for a maximum of 8 transmission antenna ports must be additionally defined in the time-frequency domain in which a CRS defined in LTE is transmitted every subframe in a full band. In the LTE-A system, if an RS pattern for the maximum of 8 transmission antenna is added to a full band every subframe using a method, such as that for the CRS of the existing LTE, RS overhead excessively increases.

Accordingly, an RS newly designed in the LTE-A system may be basically divided into two types, that is, an RS for channel measurement for the selection of an MCS, PMI, and the like (channel state information-RS, channel state indication-RS (CSI-RS), etc.) and a data demodulation (DM)-RS for data demodulation transmitted in 8 transmission antennas.

The existing CRS is used for channel measurement, the measurement of handover, etc. And for data demodulation, whereas the CSI-RS for channel measurement is designed for a channel measurement-oriented purpose. Furthermore, the CSI-RS for channel measurement may also be used for the measurement of handover. Since the CSI-RS is used to obtain information on the channel state only, it does not need to be transmitted every subframe unlike the CRS. In order to reduce overhead of the CSI-RS, the CSI-RS is intermittently transmitted on the time axis.

A DM-RS is dedicatedly transmitted to a UE scheduled in a corresponding time-frequency domain for data demodulation. That is, the DM-RS of a specific UE is transmitted only in a region in which a corresponding UE is scheduled, that is, only in a time-frequency domain in which data is received.

In the LTE-A system, an eNB has to transmit a CSI-RS for all antenna ports. To transmit a CSI-RS for a maximum of 8 transmission antenna ports every subframe has a disadvantage in that overhead is too great. Accordingly, the CSI-RS is not transmitted every subframe, but needs to be intermittently transmitted in the time axis in order to reduce corresponding overhead. That is, the CSI-RS may be periodically transmitted in the period of a multiple of one subframe or may be transmitted in a specific transmission pattern. In this case, the period or pattern in which the CSI-RS is transmitted may be configured by the eNB.

In order to measure a CSI-RS, a UE must be aware of the transmission subframe index of a CSI-RS for each CSI-RS antenna port of a cell to which the UE belongs, a CSI-RS resource element (RE) time-frequency position within the transmission subframe, and information on a CSI-RS sequence.

In the LTE-A system, an eNB needs to transmit a CSI-RS with respect to each of a maximum of 8 antenna ports. Resources used for the CSI-RS transmission of different antenna ports need to be orthogonal. When one eNB transmits CSI-RSs for different antenna ports, it may orthogonally allocate resources according to the FDM/TDM scheme by mapping the CSI-RSs for the respective antenna ports to different REs. Alternatively, the eNB may transmit the CSI-RSs for different antenna ports according to a CDM scheme for mapping the CSI-RSs to orthogonal codes.

When an eNB notifies its own cell UE of information on a CSI-RS, first, it has to notify the UE of information on a time-frequency to which a CSI-RS for each antenna port is mapped. Specifically, the information includes subframe numbers in which a CSI-RS is transmitted or the period in which a CSI-RS is transmitted, a subframe offset in which a CSI-RS is transmitted, an OFDM symbol number in which a CSI-RS RE of a specific antenna is transmitted, frequency spacing, an offset or shift value of an RE in the frequency axis, and so on.

Communication System Using Ultra-High Frequency Band

In a long term evolution (LTE)/LTE-A (LTE Advanced) system, an error value of an oscillator of a user equipment (UE) and a base station (BS) is defined as a requirement and described as follows.

UE side frequency error (in TS 36.101)

The UE modulated carrier frequency shall be accurate to within ±0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, oscillator accuracy according to types of BSs is shown in Table 3 below.

TABLE 3

| BS class | Accuracy |
|---|---|
| Wide Area BS | ±0.05 ppm |
| Local Area BS | ±0.1 ppm |
| Home BS | ±0.25 ppm |

Therefore, a maximum difference of oscillators between the BS and the UE is ±0.1 ppm, and when an error occurs in one direction, a maximum of offset value of 0.2 ppm may occur. This offset value is multiplied by a center frequency and converted into Hz units appropriate for each center frequency.

Meanwhile, in the OFDM system, a center frequency offset (CFO) value appears to be different due to a frequency tone interval, and in general, even a large CFO value has a relatively small effect in the OFDM system having a sufficiently large frequency tone interval. Therefore, an actual CFO value (absolute value) needs to be expressed as a relative value affecting the OFDM system, which is called a normalized CFO. The normalized CFO is expressed as a value obtained by dividing by the CEO value by the frequency tone interval.

Table 4 below shows the CFO for each center frequency and oscillator error value and the normalized CFO.

TABLE 4

| Center frequency | Oscillator Offset | | | |
|---|---|---|---|---|
| (subcarrier spacing) | ±0.05 ppm | ±0.1 ppm | ±10 ppm | ±20 ppm |
| 2 GHz | ±100 Hz | ±200 Hz | ±20 kHz | ±40 kHz |
| (15 kHz) | (±0.0067) | (±0.0133) | (±1.3) | (±2.7) |
| 30 GHz | ±1.5 kHz | ±3 kHz | ±300 kHz | ±600 kHz |
| (104.25 kHz) | (±0.014) | (±0.029) | (±2.9) | (±5.8) |
| 60 GHz | ±3 kHz | ±6 kHz | ±600 kHz | ±1.2 MHz |
| (104.25 kHz) | (±0.029) | (±0.058) | (±5.8) | (±11.5) |

In Table 4, when the center frequency is 2 GHz (e.g., LTE Rel-8/9/10), the frequency tone interval (15 kHz) is assumed, and when the center frequency is 30 GHz and 60 GHz, the frequency tone interval of 104.25 kHz is used, thereby preventing performance degradation in consideration of a Doppler effect for each center frequency. Table 2 above is a simple example and it is obvious that other frequency tone intervals may be used for the center frequency.

Meanwhile, a Doppler spread phenomenon significantly occurs in a situation where the UE moves at high speed or moves in a high frequency band. The Doppler spread causes spread in the frequency domain, resulting in distortion of a received signal at the receiver's point of view. The Doppler spread may be expressed as $f_{doppler} = (v/\lambda)\cos\theta$ In this case, v is a moving speed of the UE, and $\lambda$, is a wavelength of a center frequency of a transmitted radio wave. $\theta$ is an angle between a received radio wave and the moving direction of the UE. The following description is based on the assumption that $\theta$ is zero.

Here, a coherence time is in inverse proportion to the Doppler spread. If the coherence time is defined as a time interval in which a correlation value of a channel response in the time domain is 50% or more, it is expressed as $$T_c \approx \frac{9}{16\pi f_{doppler}}.$$

In the wireless communication system, Equation 4 below, which represents a geometric mean between the equation for Doppler spread and the equation for the coherence time, is mainly used.

$$T_c = \sqrt{\frac{9}{16\pi f_{doppler}}} = \frac{0.423}{f_{doppler}} \quad \text{[Equation 4]}$$

New Radio Access Technology System

As more and more communication devices require larger communication capacity, there is a need for improved mobile broadband communication compared to the existing radio access technology (RAT). Further, massive machine type communications (MTCs), which provide various services anytime and anywhere by connecting many devices and objects, are also considered. In addition, a communication system design considering a service/UE sensitive to reliability and latency is also being discussed.

The introduction of next generation radio access technology considering enhanced mobile broadband communication, massive MTC, ultra-reliable and low latency communication (URLLC) is discussed, and in the present disclosure, the technology is called new RAT (hereinafter, referred to as NR) for convenience.

Self-Contained Subframe Structure

Figure 6:
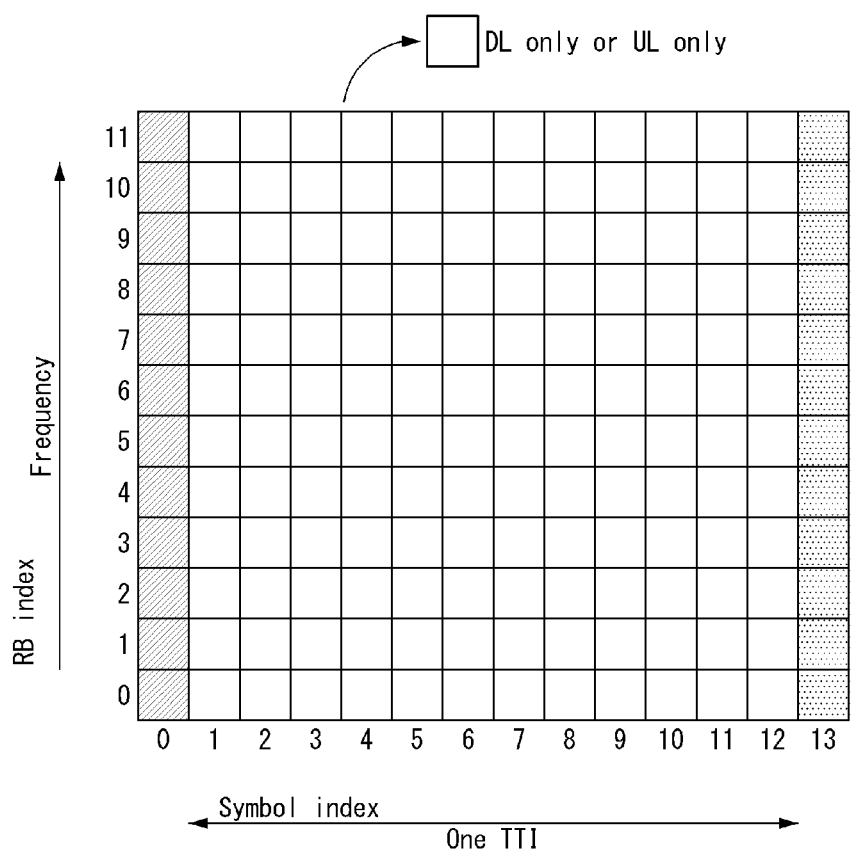
FIG. 6 is a diagram illustrating one example of a subframe structure to which the present disclosure may be applied.

FIG. 6 is a diagram illustrating one example of a subframe structure to which the present disclosure may be applied.

In FIG. 6, a dashed area (e.g., symbol index=0) indicates a downlink control region and a black area (e.g., symbol index=13) indicates an uplink control area. Other areas (e.g., symbol index=1 to 12) may also be used for downlink data transmission or for uplink data transmission.

Such a structure is characterized in that DL transmission and UL transmission are sequentially performed in one subframe, and DL data is transmitted/received in one subframe, and UL ACK/NACK therefor may also be transmitted/received. As a result, such a structure reduces a time required for retransmission of data when a data transmission error occurs, thereby minimizing the latency of final data transmission.

In such a self-contained subframe structure, there is a need for a time gap with a predetermined time length between the eNB and the UE for switching from a transmission mode to a reception mode or switching from the reception mode to the transmission mode. To this end, some OFDM symbols at the time of switching from DL to UL in the self-contained subframe structure are configured to a guard period (GP).

In the detailed description, it is described that the self-contained subframe structure includes both a DL control region and a UL control region, but the control regions may be selectively included in the self-contained subframe structure. In other words, the self-contained subframe structure according to the present disclosure may include only the DL control region or the UL control region in addition to both the DL control region and the UL control region as illustrated in FIG. 6.

OFDM Numerology

In a New RAT system uses an OFDM transmission scheme or a similar transmission scheme thereto. In this case, the New RAT system may representatively have OFDM numerology shown in Table 5.

TABLE 5

| Parameter | Value |
| --- | --- |
| Subcarrier-spacing (Δf) | 75 kHz |
| OFDM symbol length | 13.33 us |
| Cyclic Prefix (CP) length | 1.04 us/0/94 us |
| System BW | 100 MHz |
| No. of available subcarriers | 1200 |
| Subframe length | 0.2 ms |
| Number of OFDM symbol per Subframe | 14 symbols |

Alternatively, in the New RAT system may use the OFDM transmission scheme or the similar transmission scheme thereto and use OFDM numerology selected among multiple OFDM numerologies shown in Table 6. Specifically, as disclosed in Table 6, the New RAT system may use OFDM numerology having 30, 60, and 120 kHz subcarrier spacing having a multiple relationship of the 15 kHz subcarrier spacing based on the 15 kHz subcarrier spacing used in the LTE system.

In this case, a cyclic prefix, a system bandwidth (BW), and the number of available subcarriers are just one example applicable to the New RAT system according to the present disclosure and the values may be modified according to an implementation scheme. Representatively, in the case of the 60 kHz subcarrier spacing, the system bandwidth may be configured to 100 MHz and in this case, the number of available subcarriers may have a value which is larger than 1500 and smaller than 1666. Further, a subframe length and the number of OFDM symbols per subframe may also be just one example applicable to the New RAT system according to the present disclosure and the values may be modified according to the implementation scheme.

TABLE 6

| Parameter | Value | Value | Value | Value |
| --- | --- | --- | --- | --- |
| Subcarrier-spacing (Δf) | 15 kHz | 30 kHz | 60 kHz | 120 kHz |
| OFDM symbol length | 66.66 us | 33.33 us | 16.66 us | 8.33 us |
| Cyclic Prefix (CP) length | 5.20 us/4.69 us | 2.60 us/2.34 us | 1.30 us/1.17 us | 6.51 us/5.86 us |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

Analog Beamforming

In a millimeter wave (mmW), a wavelength is shortened, so that a plurality of antenna elements can be installed in the same area. That is, a total of 100 antenna elements may be installed in a 2-dimension array at a 0.5 lambda (wavelength) interval on a panel of 5×5 cm with a wavelength of 1 cm in a 30 GHz band. Therefore, in the mmW, it is possible to increase a beamforming (BF) gain to increase coverage or increase throughput by using multiple antenna elements.

In this case, each antenna element may include a transceiver unit so as to adjust transmission power and a phase for each antenna element. Therefore, each antenna element may perform independent beamforming for each frequency resource.

However, when the TXRUs are installed on all 100 antenna elements, there is a problem that effectiveness is deteriorated in terms of a price. Therefore, a scheme of mapping multiple antenna elements to one TXRU and adjusting a direction of a beam using an analog phase shifter is considered. Such an analog beamforming scheme has a disadvantage in that frequency selective beamforming is difficult by making only one beam direction in all bands.

As a solution method therefor, hybrid beamforming (BF) with B TXRUs that are fewer than Q antenna elements, as an intermediate form of digital beamforming and analog beamforming, may be considered. In this case, although there is a difference depending on a connection method of B TXRUs and Q antenna elements, the number of directions of the beams that MAY be transmitted at the same time may be limited to B or less.

Figure 7:
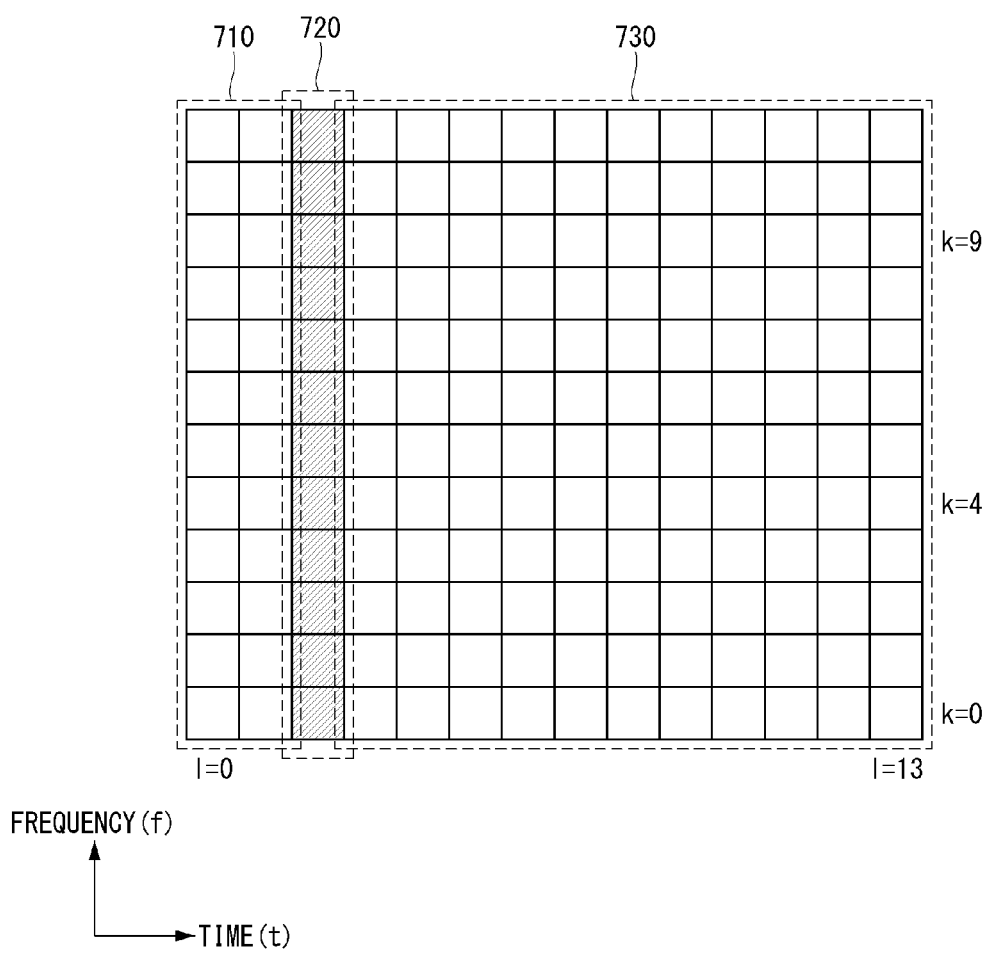
FIG. 7 illustrates one example of a resource region structure used in a communication system using mmWave to which the present disclosure may be applied.

FIG. 7 illustrates one example of a resource region structure used in a communication system using mm Wave to which the present disclosure may be applied. The communication system using an ultra-high frequency band such as mm Wave uses a frequency band having a different physical property from an LTE/LTE-A communication system in the related art. As a result, in the communication system using the ultra-high frequency band, a resource structure of a different type from the structure of the resource region used in the communication system in the related art is discussed. FIG. 6 illustrates an example of a downlink resource structure in a new communication system.

When a resource block (RB) pair is considered, which is constituted by 14 Orthogonal Frequency Division Multiplexing (OFDM) symbols on a horizontal axis and 12 frequency tones on a vertical axis, first two (or three) OFDM symbols 710 may be allocated to a control channel (e.g., Physical Downlink Control Channel (PDCCH), a DeModulation Reference Signal (DMRS) may be allocated to next one to two OFDM symbols 720, and remaining OFDM symbols 730 may be allocated to a data channel (e.g., Physical Downlink Shared Channel (PDSCH)).

Meanwhile, in the resource region structure illustrated in FIG. 7, a Phase Tracking Reference Signal (PTRS) for CPE (or CFO) estimation may be loaded to some resource elements (REs) of a region 630 to which the data channel is allocated and transmitted to the UE. The signal may be a signal for estimating phase noise and as described above, the signal may be a pilot signal or a signal acquired by changing or replicating a data signal.

The present disclosure proposes a method for mapping and transmitting the DMRS for channel estimation in downlink or uplink.

Figure 8:
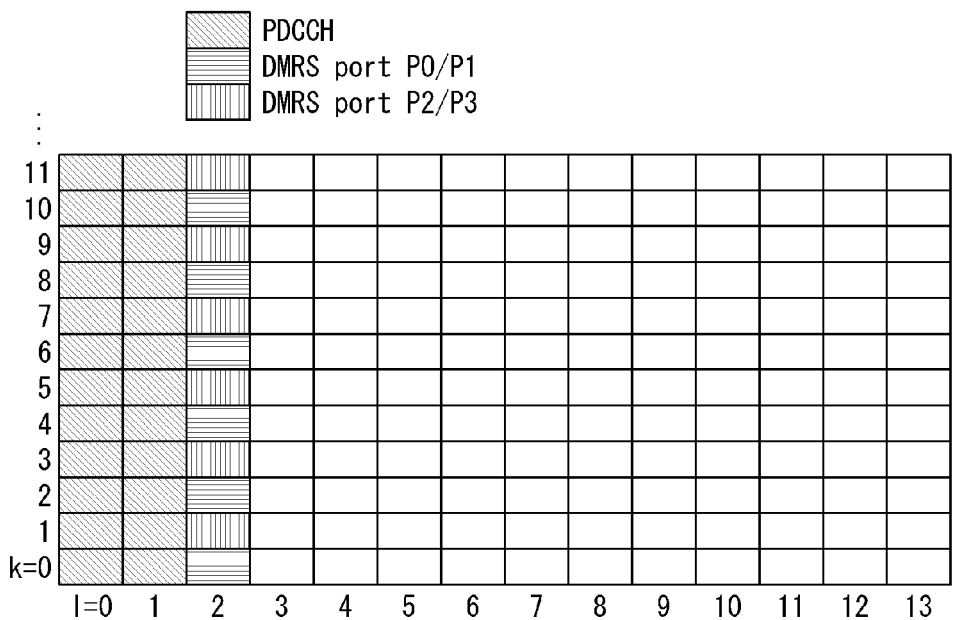
FIGS. 8 to 9 are diagrams illustrating one example of a pattern of a demodulation reference signal proposed by the present disclosure.
Figure 8:
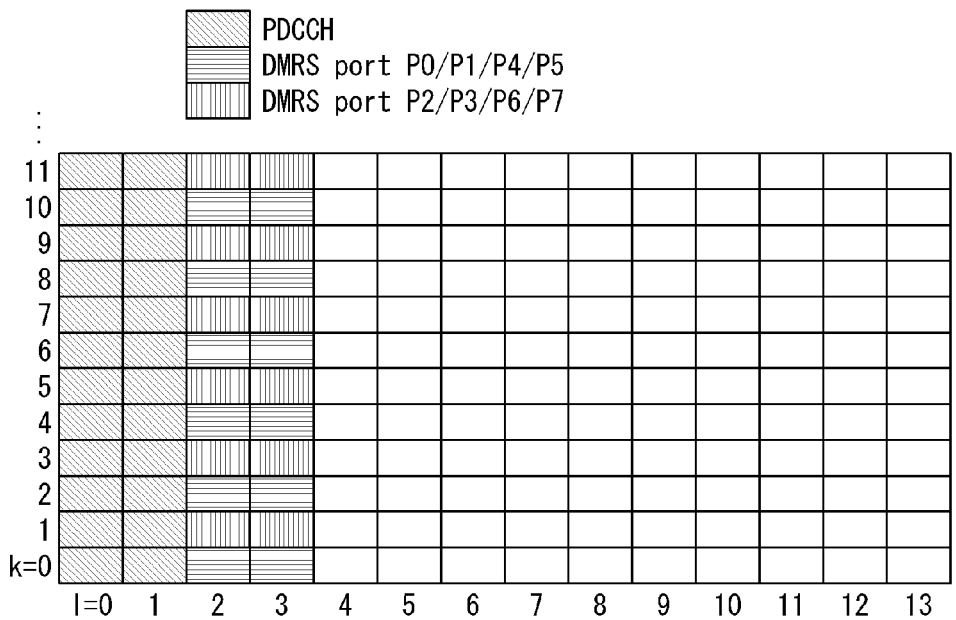
Figure 9:
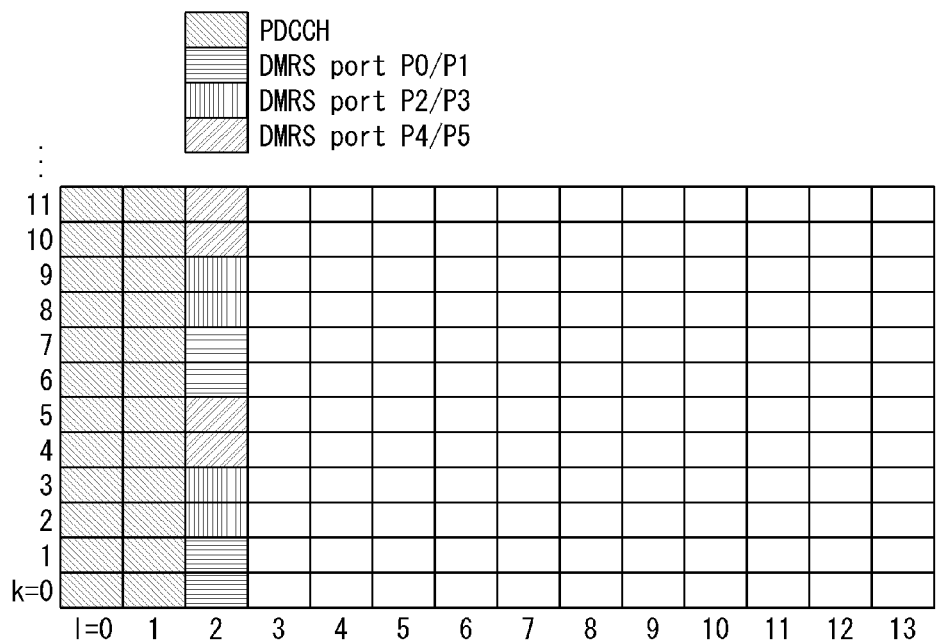
Figure 9:
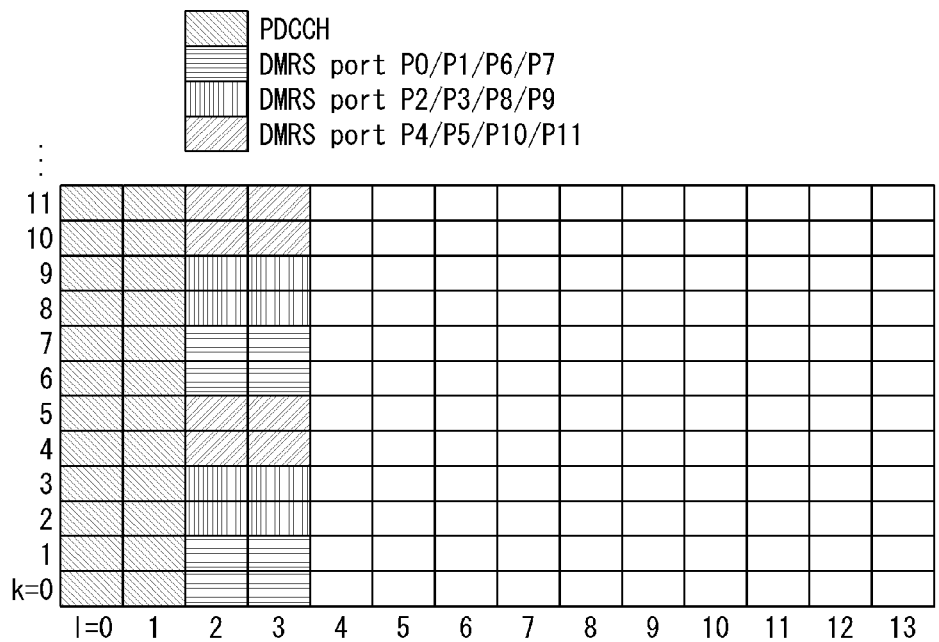

FIGS. 8 and 9 illustrate one example of a pattern of a demodulation reference signal proposed by the present disclosure.

Referring to FIGS. 8 and 9, the demodulation reference signal for estimating the channel may be mapped to one symbol or two symbols according to the maximum number of antenna ports.

Specifically, the uplink DMRS and the downlink DMRS may be generated by the following method and mapped to the resource region. FIG. 8 illustrates one example of an uplink or downlink DMRS mapped to a physical resource according Type 1 and FIG. 9 illustrates one example of the uplink or downlink DMRS mapped to the physical resource according Type 2.

UEs in the cell may have two following DMRS configurations for UL/DL CP-OFDM by the higher layer.

DMRS configuration 1: In the case of supporting eight antenna ports, one of two following types may be selected with an IFDM based pattern using Comb 2.

One OFDM symbol: Comb 2+2CS up to 4 ports
Two OFDM symbols: Comb 2+2 CS+TD-OCC({1 1} and {1 −1}) up to 8 ports DMRS configuration 2: In the case of supporting 12 antenna ports, one of two following types may be selected with an FD-OCC pattern having an adjacent RE in the frequency domain.

One OFDM symbol: 2-FD-OCC cross the adjacent RE in the frequency domain up to 6 ports
Two OFDM symbols: 2-FD-OCC+TD-OCC ({1, 1} and {1, −1}) cross the adjacent RE in the frequency domain up to 12 ports The eNB may transmit to the UE information related to the DMRS pattern of the UL and/or DL and/or a configuration of port mapping.

That is, when multiple DMRS patterns are defined, a confusion may occur in the pattern and/or port mapping due to the same parameter (e.g., the same port index, the same port number, etc.) and the eNB may not announce to the UE the DMRS pattern through the DCI signalling by dividing each situation of the UE because the signalling overhead increases.

Accordingly, the eNB may announce to the UE the information related to the pattern and/or port mapping through the RRC signalling with respect to the pattern and/or port mapping of the DMRS of which confusion due the same parameter may occur.

That is, a specific pattern among the patterns of the applicable DMRS may be announced to the UE through the RRC signalling.

The parameter which may be transmitted from the eNB to the UE through the RRC signalling may be at least one of the number of OFDM symbols for the DMRS, a pattern type (configuration 1 or 2 described above), and a CDM length in the frequency domain, an OCC type (e.g., {1 1} and {1−1}, {1 1}, etc.) or a Comb type (e.g., Comb 2, Comb 3, etc.) in the time domain.

In this case, the port number and/or the port index may be transmitted from the eNB to the UE through the DCI signalling.

Alternatively, the eNB may transmit to the UE at least one DMRS pattern which may be transmitted through the DCI signalling according to the number of OFDM symbols to which the DMRS is mapped through the RRC signalling instead of a specific pattern.

For example, the eNB transmits to the UE whether configuration 1 or 2 is applied according to the number of OFDM symbols to which the DMRS is mapped, TD-OCC, repetition, or whether TDM is applied through the RRC signalling.

In this case, the parameter which may be transmitted from the eNB to the UE through the RRC signalling may be at least one of the pattern type (configuration 1 or 2 described above), and the CDM length in the frequency domain, the OCC type (e.g., {1 1} and {1−1}, {1 1}, etc.) in the time domain, the Comb type (e.g., Comb 2, Comb 3, etc.), the TD-OCC, or whether the TDM is applied.

In this case, the OFDM symbol to which the DMRS is mapped, the port number and/or the port index may be transmitted from the eNB to the UE through the DCI signalling.

Further, the eNB may define a plurality of time domain sequences meaning a sequence by which a base sequence is additionally multiplied for orthogonality, repetition, non-transmission, etc., and announce to the UE TD-OCC 1 (TD-OCC) or TD-OCC 2 (TD repetition) through the higher layer signalling.

In this case, the UE assumes that the DMRS is mapped to two OFDM symbols, but when using a specific DCI format, the UE assumes TD-OCC 0 in which the DMRS is mapped to one symbol.

However, the UE assumes TD-OCC 0 in which the DMRS is mapped to one symbol when there is no separate higher layer signalling in association with a time domain sequence.

Table 7 below shows one example of TD-OCC for the DMRS.

TABLE 7

| Index | FD-CS | TD-OCC 0 | TD-OCC 1 | TD-OCC 2 |
|---|---|---|---|---|
| 1 | [+1 +1 +1 +1] | [+1 0] | [+1 +1] | [+1 +1] |
| 2 | [+1 −1 +1 −1] | [+1 0] | [+1 +1] | [+1 +1] |
| 3 | [+1 +1 +1 +1] | [+1 0] | [+1 +1] | [+1 +1] |
| 4 | [+1 −1 +1 −1] | [+1 0] | [+1 +1] | [+1 +1] |
| 5 | [+1 +j −1 −j] | [+1 0] | [+1 −1] | [+1 +1] |
| 6 | [+1 +j −1 −j] | [+1 0] | [+1 −1] | [+1 +1] |
| 7 | [+1 −j −1 +j] | [+1 0] | [+1 −1] | [+1 +1] |
| 8 | [+1 −j −1 +j] | [+1 0] | [+1 −1] | [+1 +1] |

The maximum number of OFDM symbols of the control channel is variable as 2 to 3, and as a result, the maximum number of symbols of the OFDM to which control information is mapped may be configured for the UE through the higher layer signalling transmitted from the eNB and/or a fixed rule applied between the eNB and the UE.

In this case, the eNB may determine the location of the OFDM symbol to which the DMRS is mapped according to the maximum symbol number of the control channel.

For example, the DMRS may be mapped to a symbol immediately next to a last OFDM symbol to which the maximum symbol number of the control channel is mapped.

Alternatively, since the maximum number of OFDM symbols of the control channel may be changed according to the slot structure, the eNB may determine the location of the OFDM symbol to which the DMRS is mapped according to the slot structure.

When the location to which the DMRS is mapped is changed according to the maximum OFDM symbol number of the control channel, the locations of the DMRSs mapped of neighboring cells may be different from each other.

In this case, the eNB may inform the UE of the location of the DMRS of the neighboring cell through an explicit or implicit method.

When the eNB explicitly informs the UE of the location of the DMRS of the neighboring cell, the eNB may inform the UE of the location of the DMRS of the neighboring cell through the RRC signalling or DCI signalling.

When the eNB implicitly informs the UE of the location of the DMRS of the neighboring cell, the eNB may inform the UE of the maximum OFDM symbol number of the control channel of the neighboring cell.

In this case, the eNB may determine the location of the DMRS according to the maximum number of OFDM symbols in the control channel, and therefore the UE may estimate the DMRS location of the neighboring cell from the maximum number of OFDM symbols of the control channel of the neighboring cell, which is transmitted from the eNB.

Alternatively, the UE may perform blind detection of the DMRS location of the neighboring cell based on the maximum number of OFDM symbols of the control channel of the neighboring cell transmitted from the eNB.

However, when the location of the DMRS of the neighboring cell or information related to the location of the DMRS is not transmitted from the eNB, the UE assumes the location of the DMRS of the neighboring cell as a location which is the same as the location of the DMRS of the serving cell or perform the blind detection for the DMRS of the neighboring cell based on the location of the DMRS of the serving cell.

Hereinafter, the uplink DMRS and the downlink DMRS will be separately described.

Demodulation Reference Signal for PUSCH

A reference signal sequence r(m) for generating the uplink DMRS is generated by Equation 5 below when transform precoding for the PUSCH is not permitted.

In this case, one example of the case where the transform precoding for the PUSCH is not permitted may include a case of generating a CP-OFDM scheme transmission signal.

$$r(m) = \frac{1}{\sqrt{2}}(1 - 2 \cdot c(2m)) + j\frac{1}{\sqrt{2}}(1 - 2 \cdot c(2m+1))$$ [Equation 5]

Here, c(i) means the pseudo-random sequence.

The reference signal sequence r(m) is generated by Equation 6 below when the transform precoding for the PUSCH is permitted.

In this case, one example of the case where the transform precoding for the PUSCH is permitted may include a case of generating a DFT-S-OFDM scheme transmission signal.

$$r(m) = e^{-j\frac{\pi qm(m+1)}{L}}$$ [Equation 6]

The DMRS of the generated PUSCH is mapped to the physical resource according to given Type 1 or Type 2 by a higher layer parameter as illustrated in FIGS. 7 and 8.

In this case, the DMRS may be mapped to a single symbol or double symbols according to the number of antenna ports.

When the transform precoding is not permitted, the reference signal sequence r(m) may be mapped to the physical resource by Equation 7 below.

$$a_{k,l}^{(p,u)} = \beta_{DMRS} w_f(k') \cdot w_t(l') \cdot r(2m + k' + m_0)$$ [Equation 7]

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \bar{l} + l'$$

In Equation 7 above, l is relatively defined at the start of PUSCH transmission and $w_f(k')$, $w^t(1')$, and $\Delta$ are given by Tables 5 and 6 below.

Table 8 below shows one example of the parameters for the DMRS of the PUSCH for Type 1.

TABLE 8

| p | Δ | $w_f(k')$ k'=0 | $w_f(k')$ k'=1 | $w_t(l')$ l'=0 | $w_t(l')$ l'=1 |
|---|---|---|---|---|---|
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

Table 9 below shows one example of the parameters for the DMRS of the PUSCH for Type 2.

TABLE 9

| p | Δ | $w_f(k')$ k'=0 | $w_f(k')$ k'=1 | $w_t(l')$ l'=0 | $w_t(l')$ l'=1 |
|---|---|---|---|---|---|
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

Table 10 below shows one example of a time domain index l' and a supported antenna port p depending on a higher layer parameter UL_DMRS_dur.

TABLE 10

| UL_DMRS_dur | l' | p Type 1 | p Type 2 |
|---|---|---|---|
| Single-symbol DMRS | 0 | 1000–1003 | 1000–1005 |
| Double-symbol DMRS | 0, 1 | 1000–1007 | 1000–1011 |

Table 11 below shows one example of a start location of the DMRS of the PUSCH.

TABLE 11

| Uplink DMRS parameter | Single symbol DMRS PUSCH mapping type A | Single symbol DMRS PUSCH mapping type B | Double symbol DMRS PUSCH mapping type A | Double symbol DMRS PUSCH mapping type B |
|---|---|---|---|---|
| 0 | $l_0$ | $l_0$ | $l_0$ | $l_0$ |
| 1 | $l_0$, 7 | | | |
| 2 | $l_0$, 9 | | | |
| 3 | $l_0$, 11 | | | |

As another embodiment of the present disclosure, in order to use a quasi-orthogonal DMRS sequence for different transmission beams, information related to the beam may be included in an initialization parameter of the base sequence of the DMRS.

In this case, the information related to the beam may include at least one of a CRI, a port index, or an SS block index.

In this case, since the information related to the beam need not be transmitted in a DCI table, the signalling overhead may be reduced.

Demodulation Reference Signals for PDSCH

The reference signal sequence r(m) for generating the downlink DMRS is generated by Equation 8 below.

$$r(m) = \frac{1}{\sqrt{2}}(1 - 2 \cdot c(2m)) + j\frac{1}{\sqrt{2}}(1 - 2 \cdot c(2m+1))$$ [Equation 8]

Here, c(i) means the pseudo-random sequence.

The DMRS of the generated PDSCH is mapped to the physical resource according to given Type 1 or Type 2 by the higher layer parameter as illustrated in FIGS. 7 and 8.

In this case, the reference signal sequence r(m) may be mapped to the physical resource by Equation 9 below.

$$a_{k,l}^{(p,u)} = \beta_{DMRS} w_f(k') \cdot w_t(l') \cdot r(2m + k' + m_0)$$ [Equation 9]

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \bar{l} + l'$$

In Equation 9 above, l is relatively defined at the start of the slot and $w_f(k')$, $w_t(l')$, and $\Delta$ are given by Tables 12 and 13 below.

A time axis index l' and supported antenna ports p vary depending on the higher layer parameter DL_DMRS_dur according to Table 14 below. An $\bar{l}$ value varies depending on a higher layer parameter given in Table 15 according to the mapping pattern.

For PDSCH mapping pattern A: If higher layer parameter DL_DMRS_typeA_pos is equal to 3, $l_0=3$ and if not, $l_0=2$.

For PDSCH mapping pattern B: $l_0$ is mapped to a first OFDM symbol in a PDSCH resource in which the DMRS is scheduled.

Table 12 below shows one example of the parameters for DMRS configuration type 1 of the PDSCH.

TABLE 12

| p | Δ | $w_f(k')$ k'=0 | $w_f(k')$ k'=1 | $w_t(l')$ l'=0 | $w_t(l')$ l'=1 |
|---|---|---|---|---|---|
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

Table 13 below shows one example of the parameters for DMRS configuration type 2 of the PDSCH.

TABLE 13

| p | Δ | $w_f(k')$ k'=0 | $w_f(k')$ k'=1 | $w_t(l')$ l'=0 | $w_t(l')$ l'=1 |
|---|---|---|---|---|---|
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

Table 14 below shows one example of l' which is duration of the PDSCH DMRS.

TABLE 14

| DL_DMRS_dur | l' | p Type 1 | p Type 2 |
|---|---|---|---|
| Single-symbol DMRS | 0 | 1000-1003 | 1000-1005 |
| Double-symbol DMRS | 0, 1 | 1000-1007 | 1000-1011 |

Table 15 below shows one example of a start location $\bar{l}$ of the DMRS of the PDSCH.

TABLE 15

| | $\bar{l}$ | | | |
|---|---|---|---|---|
| | Single symbol DMRS | | Double symbol DMRS | |
| Downlink DMRS parameter | PDSCH mapping type A | PDSCH mapping type B | PDSCH mapping type A | PDSCH mapping type B |
| 0 | $l_0$ | $l_0$ | $l_0$ | $l_0$ |
| 1 | $l_0$, 7 | | | |
| 2 | $l_0$, 9 | | | |
| 3 | $l_0$, 11 | | | |

Further, the eNB may define a plurality of time domain sequences meaning a sequence by which a base sequence is additionally multiplied for orthogonality, repetition, non-transmission, etc., and announce to the UE TD-OCC 1 (TD-OCC) or TD-OCC 2 (TD repetition) through the higher layer signalling.

In this case, the UE assumes that the DMRS is mapped to two OFDM symbols, but when using a specific DCI format, the UE assumes TD-OCC 0 in which the DMRS is mapped to one symbol.

However, the UE assumes TD-OCC 0 in which the DMRS is mapped to one symbol when there is no separate higher layer signalling in association with a time domain sequence.

Table 16 below shows one example of TD-OCC for the DMRS.

TABLE 16

| Index | FD-CS | TD-OCC 0 | TD-OCC 1 | TD-OCC 2 |
|---|---|---|---|---|
| 1 | [+1 +1 +1 +1] | [+1 0] | [+1 +1] | [+1 +1] |
| 2 | [+1 −1 +1 −1] | [+1 0] | [+1 +1] | [+1 +1] |
| 3 | [+1 +1 +1 +1] | [+1 0] | [+1 +1] | [+1 +1] |
| 4 | [+1 −1 +1 −1] | [+1 0] | [+1 +1] | [+1 +1] |

TABLE 16-continued

| Index | FD-CS | TD-OCC 0 | TD-OCC 1 | TD-OCC 2 |
|---|---|---|---|---|
| 5 | [+1 +j −1 −j] | [+1 0] | [+1 −1] | [+1 +1] |
| 6 | [+1 +j −1 −j] | [+1 0] | [+1 −1] | [+1 +1] |
| 7 | [+1 −j −1 +j] | [+1 0] | [+1 −1] | [+1 +1] |
| 8 | [+1 −j −1 +j] | [+1 0] | [+1 −1] | [+1 +1] |

When the DMRS is configured in units of the OFDM symbol as described above, if the DMRS is configured in a former symbol among symbols for a fast decoding speed, a problem may occur in channel compensation.

That is, in the case of the High Doppler environment, since a channel variation amount is large in one slot (or subframe), it is difficult to perform appropriate channel compensation by using only the DMRS configured in the former symbol.

Accordingly, in order to solve the problem, the present disclosure a method for configuring the additional DMRS and decoding data by performing channel estimation through the configured DMRSs.

Further, when the DMRS is additionally configured and transmitted, if a time-axis density of the DMRS increases, there is a problem in that the RS overhead increases.

Accordingly, in order to reduce the RS overhead, a method for configuring the DMRS and the additional DMRS is provided.

Hereinafter, the DMRS which is configured by default in the present disclosure will be referred to as a first DMRS or a front-loaded DMRS and an additionally configured DMRS will be referred to as a second DMRS or an additional DMRS.

As yet another embodiment of the present disclosure, the DMRS pattern may be determined according to the number of symbols of the DMRS additionally configured in addition to the DMRS.

When a second DMRS is additionally configured in addition to a first DMRS, the pattern of the first DMRS may be determined according to information related to the configured second DMRS.

Specifically, the eNB may determine at least one of the CDM length (e.g., CS 2 or CS 4) of the frequency domain, an interval (e.g., Comb 2, Comb 4, or Comb 6), or whether the DMRS is configured based on the mapping information related to mapping of the second DMRS and port information related to a port where the DMRS is transmitted.

The mapping information may include at least one of the number of symbols to which the second DMRS is mapped, the total number of symbols to which the DMRS is mapped, or the density of the time domain of the DMRS.

The port information may indicate the maximum number of transmission ports specific to the cell or the maximum number of transmission ports specific to the UE.

When the mapping information and the port information are the same as each other, RE intervals of the first DMRS may be configured to be different from each other.

Alternatively, the eNB may select the RE interval of the first DMRS according to a channel state (e.g., Doppler, frequency selectivity, etc.) of the UE and/or a surrounding environment of the UE and indicate the selected RE interval to the UE.

In this case, the eNB may recognize the channel state of the UE from the feedback of the UE or the uplink signal of the UE.

Alternatively, the eNB may configure the maximum number of orthogonal DMRS ports differently according to the mapping information related to the mapping of the second DMRS.

As still yet another embodiment of the present disclosure, when the first DMRS is mapped to two OFDM symbols, a symbol location of a second first DMRS may be variable for estimation of the channel change by the Doppler or a DMRS for suitable for variable beam duration.

Table 17 below shows one example of the DMRS pattern according to the symbol and the transmission port of the first DMRS when the configuration of the DMRS is configuration 1. In Table 17 below, an x value in "x DMRS" on a first left column may mean the number of OFDM symbols to which the DMRS transmitted in one slot is mapped.

TABLE 17

|  | 1 port | 2 port | 3 port | 4 port | 5 port | 6 port | 7 port | 8 port |
|---|---|---|---|---|---|---|---|---|
| 1 DMRS | Comb 2 (CS2) & 1 sym (6 RE/6 RE) | Comb 2 (CS2) & 1 sym (6 RE/6 RE) | Comb 2 (CS2) & 1 sym (12 RE/12 RE) | Comb 2 (CS2) & 1 sym (12 RE/12 RE) | Comb 2 (CS2 or CS4) & 2 sym (TD-OCC or repetition) (24 RE/24 RE) | Comb 2 (CS2 or CS4) & 2 sym (TD-OCC or repetition) (24 RE/24 RE) | Comb 2 (CS2 or CS4) & 2 sym (TD-OCC or repetition) (24 RE/24 RE) | Comb 2 (CS2 or CS4) & 2 sym (TD-OCC or repetition) (24 RE/24 RE) |
| 2 DMRS | Comb 2 (CS2) & 1 sym (6 RE/12 RE) | Comb 2 (CS2) & 1 sym (6 RE/12 RE) | Comb 2 (CS2) & 1 sym (12 RE/24 RE) | Comb 2 (CS2) & 1 sym (12 RE/24 RE) |  |  |  |  |
| 3 DMRS | Comb 2 (CS2) & 1 sym (6 RE/18 RE) | Comb 2 (CS2) & 1 sym (6 RE/18 RE) |  |  |  |  |  |  |
| 4 DMRS | Comb 2 (CS2) & 1 sym (6 RE/24 RE) | Comb 2 (CS2) & 1 sym (6 RE/24 RE) |  |  |  |  |  |  |

Table 18 below shows one example of a DMRS pattern in which Comb is 4 and the length of the CS is adjusted in Table 17.

TABLE 18

|   | 1 port | 2 port | 3 port | 4 port | 5 port | 6 port | 7 port | 8 port |
|---|---|---|---|---|---|---|---|---|
| 1 DMRS | Comb 2 (CS2) & 1 sym (6 RE/6 RE) | Comb 2 (CS2) & 1 sym (6 RE/6 RE) | Comb 2 (CS2) & 1 sym (12 RE/12 RE) | Comb 2 (CS2) & 1 sym (12 RE/12 RE) | Comb 2 (CS2 or CS4) & 2 sym (TD-OCC or repetition) (24 RE/24 RE) | Comb 2 (CS2 or CS4) & 2 sym (TD-OCC or repetition) (24 RE/24 RE) | Comb 2 (CS2 or CS4) & 2 sym (TD-OCC or repetition) (24 RE/24 RE) | Comb 2 (CS2 or CS4) & 2 sym (TD-OCC or repetition) (24 RE/24 RE) |
| 2 DMRS | Comb 2 (CS2) & 1 sym (6 RE/12 RE) Or Comb 4 (CS2) & 1 sym (3 RE/6 RE) Or Comb 4 & 1 sym (3 RE/6 RE) | Comb 2 (CS2) & 1 sym (6 RE/12 RE) Or Comb 4 (CS2) & 1 sym (3 RE/6 RE) Or Comb 4 & 1 sym (6 RE/12 RE) | Comb 2 (CS2) & 1 sym (12 RE/24 RE) Or Comb 4 (CS2) & 1 sym (6 RE/12 RE) Or Comb 4 & 1 sym (9 RE/18 RE) | Comb 2 (CS2) & 1 sym (12 RE/24 RE) Or Comb 4 (CS2) & 1 sym (6 RE/12 RE) Or Comb 4 & 1 sym (12 RE/24 RE) | Comb 4 (CS2) & 1 sym (9 RE/18 RE) | Comb 4 (CS2) & 1 sym (9 RE/18 RE) | Comb 4 (CS2) & 1 sym (12 RE/24 RE) | Comb 4 (CS2) & 1 sym (12 RE/24 RE) |
| 3 DMRS | Comb 2 (CS2) & 1 sym (6 RE/18 RE) Or Comb 4 (CS2) & 1 sym (3 RE/9 RE) Or Comb 4 & 1 sym (3 RE/9 RE) | Comb 2 (CS2) & 1 sym (6 RE/18 RE) Or Comb 4 (CS2) & 1 sym (3 RE/9 RE) Or Comb 4 & 1 sym (6 RE/18 RE) | Comb 4 (CS2) & 1 sym (6 RE/18 RE) | Comb 4 (CS2) & 1 sym (6 RE/18 RE) | | | | |
| 4 DMRS | Comb 2 (CS2) & 1 sym (6 RE/24 RE) Or Comb 4 (CS2) & 1 sym (3 RE/12 RE) Or Comb 4 & 1 sym (3 RE/12 RE) | Comb 2 (CS2) & 1 sym (6 RE/24 RE) Or Comb 4 (CS2) & 1 sym (3 RE/12 RE) Or Comb 4 & 1 sym (6 RE/24 RE) | Comb 4 (CS2) & 1 sym (6 RE/24 RE) | Comb 4 (CS2) & 1 sym (6 RE/24 RE) | | | | |

Table 19 below shows one example of a DMRS pattern in which Comb is 6 and the length of the CS is adjusted in Table 17.

TABLE 19

|   | 1 port | 2 port | 3 port | 4 port | 5 port | 6 port | 7 port | 8 port |
|---|---|---|---|---|---|---|---|---|
| 1 DMRS | Comb 2 (CS2) & 1 sym (6 RE/6 RE) | Comb 2 (CS2) & 1 sym (6 RE/6 RE) | Comb 2 (CS2) & 1 sym (12 RE/12 RE) | Comb 2 (CS2) & 1 sym (12 RE/12 RE) | Comb 2 (CS2 or CS4) & 2 sym (TD-OCC or | Comb 2 (CS2 or CS4) & 2 sym (TD-OCC or | Comb 2 (CS2 or CS4) & 2 sym (TD-OCC or | Comb 2 (CS2 or CS4) & 2 sym (TD-OCC or |

TABLE 19-continued

|  | 1 port | 2 port | 3 port | 4 port | 5 port | 6 port | 7 port | 8 port |
|---|---|---|---|---|---|---|---|---|
|  |  |  |  |  | repetition) (24 RE/ 24 RE) | repetition) (24 RE/ 24 RE) | repetition) (24 RE/ 24 RE) | repetition) (24 RE/ 24 RE) |
| 2 DMRS | Comb 2 (CS2) & 1 sym (6 RE/ 12 RE) Or Comb 6 & 1 sym (2 RE/4 RE) Or Comb 6 (CS2) & 1 sym (2 RE/4 RE) | Comb 2 (CS2) & 1 sym (6 RE/ 12 RE) Or Comb 6 & 1 sym (4 RE/8 RE) Or Comb 6 (CS2) & 1 sym (2 RE/4 RE) | Comb 2 (CS2) & 1 sym (12 RE/ 24 RE) Or Comb 6 & 1 sym (6 RE/12 RE) Or Comb 6 (CS2) & 1 sym (4 RE/8 RE) | Comb 2 (CS2) & 1 sym (12 RE/ 24 RE) Or Comb 6 & 1 sym (8 RE/16 RE) Or Comb 6 (CS2) & 1 sym (4 RE/8 RE) | Comb 6 & 1 sym (10 RE/ 20 RE) Or Comb 6 (CS2) & 1 sym (8 RE/ 16 RE) | Comb 6 & 1 sym (12 RE/ 24 RE) Or Comb 6 (CS2) & 1 sym (8 RE/ 16 RE) | Comb 6 (CS2) & 1 sym (8 RE/ 16 RE) | Comb 6 (CS2) & 1 sym (8 RE/ 16 RE) |
| 3 DMRS | Comb 2 (CS2) & 1 sym (6 RE/18 RE) Or Comb 6 & 1 sym (2 RE/6 RE) Or Comb 6 (CS2) & 1 sym (2 RE/6 RE) | Comb 2 (CS2) & 1 sym (6 RE/18 RE) Or Comb 6 & 1 sym (4 RE/12 RE) Or Comb 6 (CS2) & 1 sym (2 RE/6 RE) | Comb 6 & 1 sym (6 RE/18 RE) Or Comb 6 (CS2) & 1 sym (4 RE/12 RE) | Comb 6 & 1 sym (8 RE/24 RE) Or Comb 6 (CS2) & 1 sym (4 RE/12 RE) | Comb 6 (CS2) & 1 sym (6 RE/18 RE) | Comb 6 (CS2) & 1 sym (6 RE/18 RE) | Comb 6 (CS2) & 1 sym (8 RE/24 RE) | Comb 6 (CS2) & 1 sym (8 RE/24 RE) |
| 4 DMRS | Comb 2 (CS2) & 1 sym (6 RE/24 RE) Or Comb 6 & 1 sym (2 RE/8 RE) Or Comb 6 (CS2) & 1 sym (2 RE/8 RE) | Comb 2 (CS2) & 1 sym (6 RE/24 RE) Or Comb 6 & 1 sym (4 RE/16 RE) Or Comb 6 (CS2) & 1 sym (2 RE/8 RE) | Comb 6 (CS2) & 1 sym (4 RE/16 RE) | Comb 6 (CS2) & 1 sym (4 RE/16 RE) | Comb 6 (CS2) & 1 sym (6 RE/24 RE) | Comb 6 (CS2) & 1 sym (6 RE/24 RE) |  |  |

Table 20 below shows one example of a DMRS pattern in which Comb is fixed and the length of the CS is adjusted in Table 17.

TABLE 20

|  | 1 port | 2 port | 3 port | 4 port | 5 port | 6 port | 7 port | 8 port |
|---|---|---|---|---|---|---|---|---|
| 1 DMRS | Comb 2 (CS2) & 1 sym (6 RE/6 RE) | Comb 2 (CS2) & 1 sym (6 RE/6 RE) | Comb 2 (CS2) & 1 sym (12 RE/ 12 RE) | Comb 2 (CS2) & 1 sym (12 RE/ 12 RE) | Comb 2 (CS2 or CS4) & 2 sym (TD-OCC or repetition) (24 RE/ 24 RE) | Comb 2 (CS2 or CS4) & 2 sym (TD-OCC or repetition) (24 RE/ 24 RE) | Comb 2 (CS2 or CS4) & 2 sym (TD-OCC or repetition) (24 RE/ 24 RE) | Comb 2 (CS2 or CS4) & 2 sym (TD-OCC or repetition) (24 RE/ 24 RE) |
| 2 DMRS | Comb 2 (CS2) & 1 sym (6 RE/ 12 RE) | Comb 2 (CS2) & 1 sym (6 RE/ 12 RE) | Comb 2 (CS2) & 1 sym (12 RE/ 24 RE) | Comb 2 (CS2) & 1 sym (12 RE/ 24 RE) | Comb 2 (CS4) & 1sym (12 RE/ 24 RE) | Comb 2 (CS4) & 1sym (12 RE/ 24 RE) | Comb 2 (CS4) & 1sym (12 RE/ 24 RE) | Comb 2 (CS4) & 1sym (12 RE/ 24 RE) |
| 3 DMRS | Comb 2 (CS2) & 1 sym (6 RE/ 18 RE) | Comb 2 (CS2) & 1 sym (6 RE/ 18 RE) | Comb 2 (CS4) & 1 sym (6 RE/ 18 RE) | Comb 2 (CS4) & 1 sym (6 RE/ 18 RE) |  |  |  |  |

TABLE 20-continued

| | 1 port | 2 port | 3 port | 4 port | 5 port | 6 port | 7 port | 8 port |
|---|---|---|---|---|---|---|---|---|
| 4 DMRS | Comb 2 (CS2) & 1 sym (6 RE/ 24 RE) | Comb 2 (CS2) & 1 sym (6 RE/ 24 RE) | Comb 2 (CS4) & 1 sym (6 RE/ 24 RE) | Comb 2 (CS4) & 1 sym (6 RE/ 24 RE) | | | | |

In Tables 17 to 20, an RE unit in parentheses means the RS overhead in on OFDM symbol or the RS overhead in the slot.

FIGS. 10 to 13 are diagrams illustrating one example of a method for determining a location of the demodulation reference signal proposed by the present disclosure.

Referring to FIGS. 10 to 13, when the first DMRS and the second DMRS are mapped to the OFDM symbols, the location to which the second DMRS is mapped may be variable.

Figure 10:
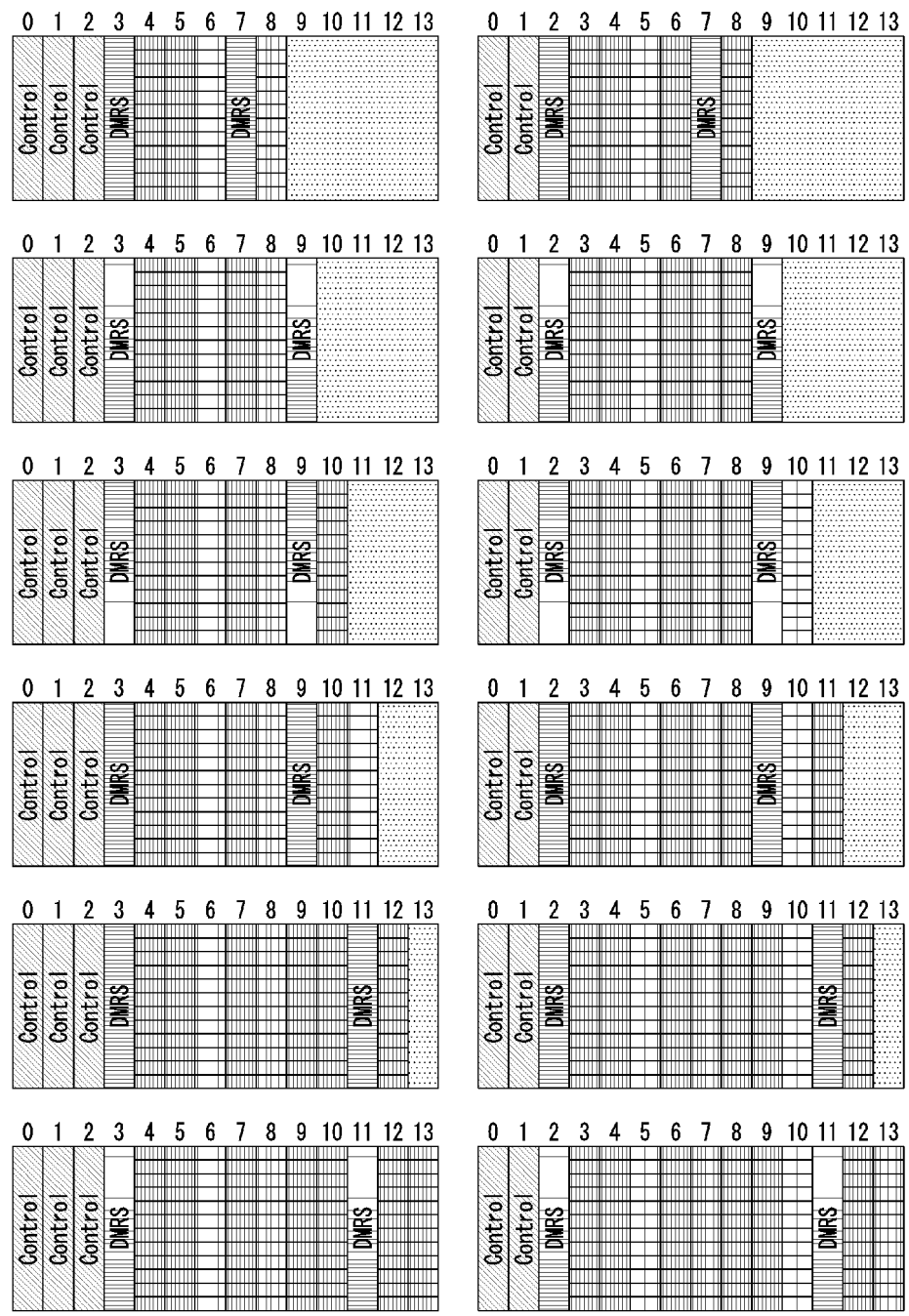
FIGS. 10 to 13 are diagrams illustrating one example of a method for determining a location of the demodulation reference signal proposed by the present disclosure.
Figure 11:
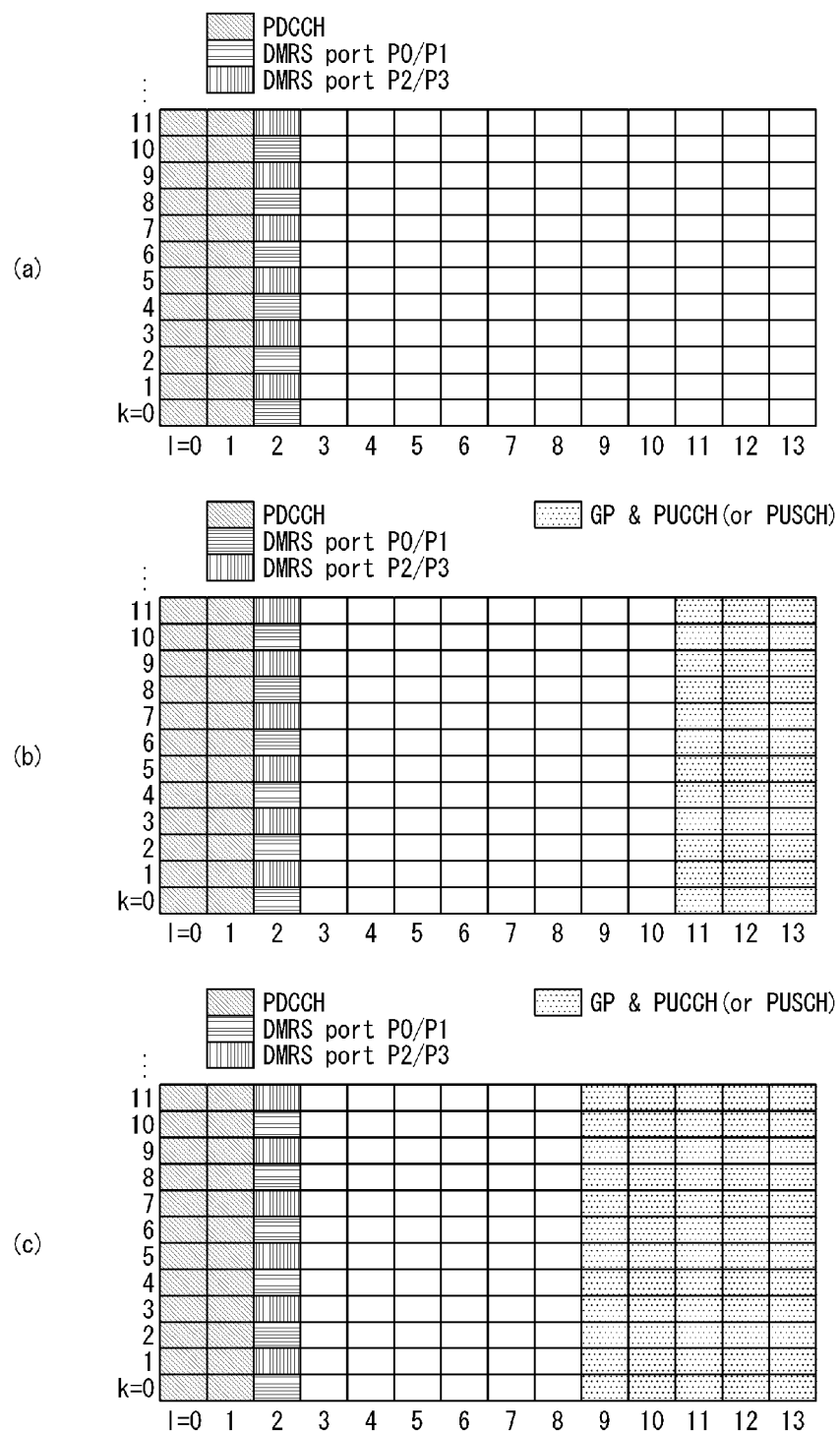
Figure 12:
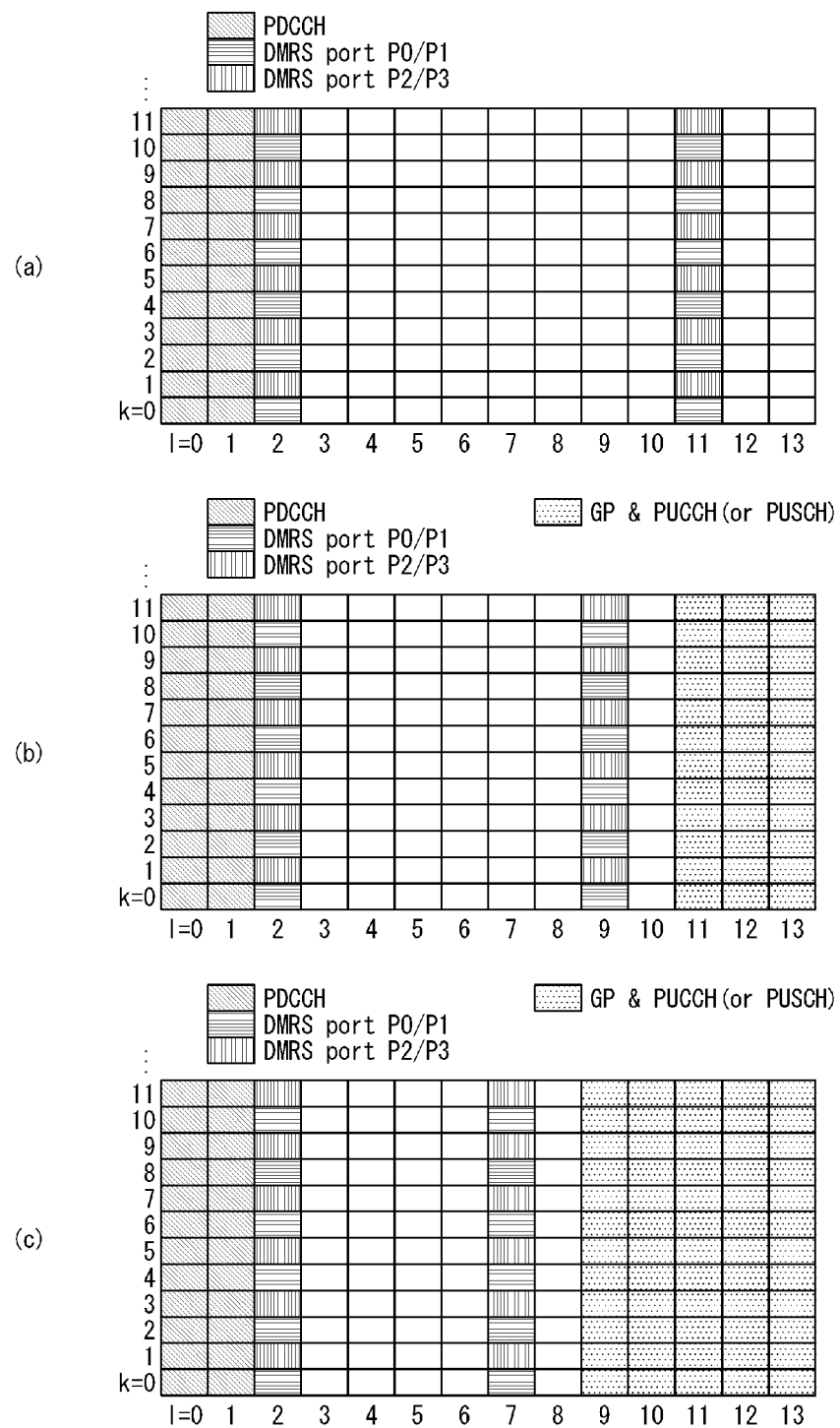
Figure 13:
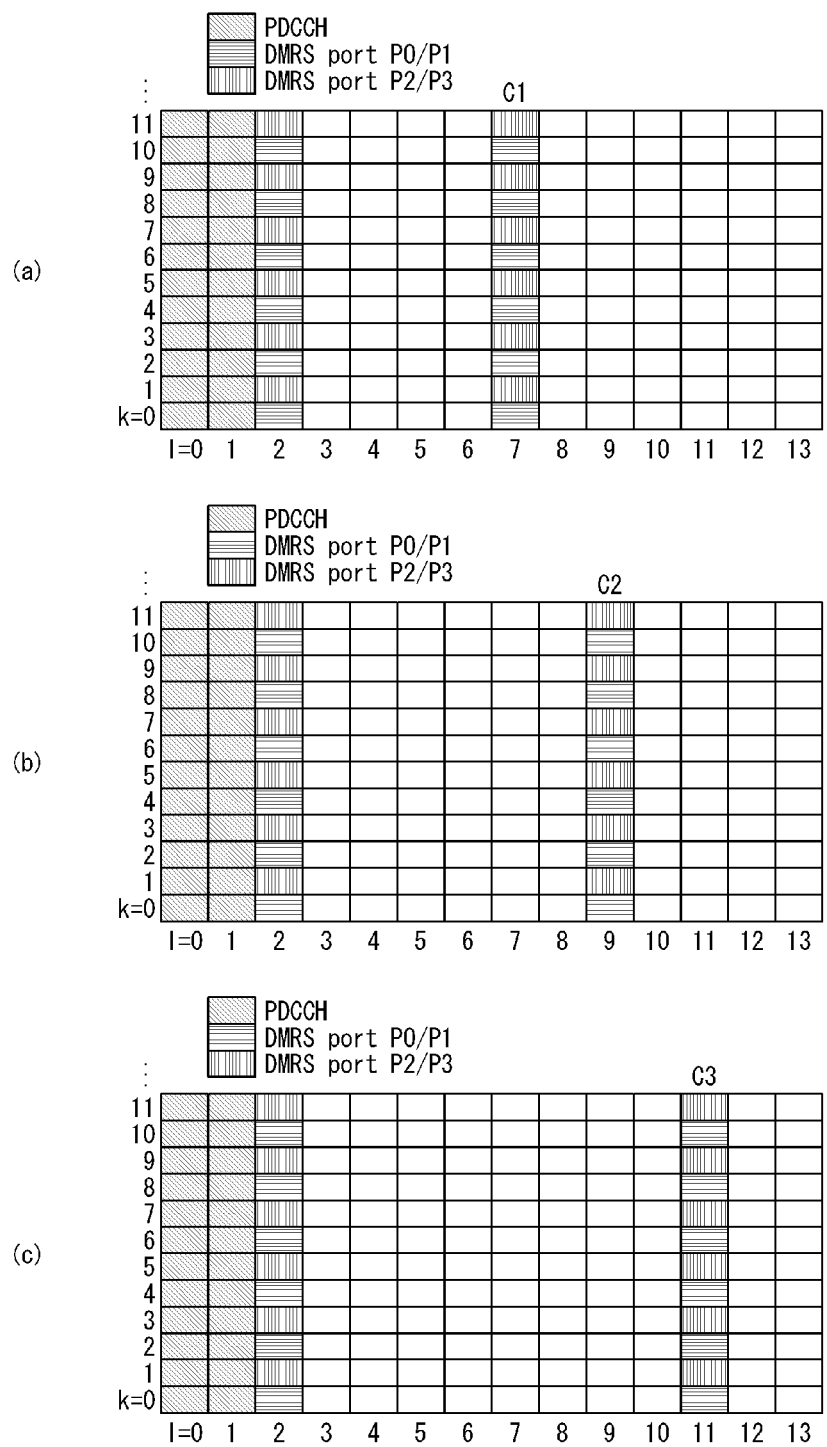

When the subframe has an OFDM symbol for a purpose other than an OFDM symbol for downlink data transmission in one subframe (or slot) like the self-contained subframe structure illustrated in FIG. 6 as illustrated in FIG. 10, whether to configure the second DMRS and the location of the second DMRS may be determined according to the structure of the subframe.

For example, when the structure of the subframe is constituted by 7 symbol slots, the second DMRS may not be transmitted and only the first DMRS may be supported and the structure of the subframe is constituted by 14 symbol slots, only the first DMRS may be supported or both the first DMRS and the second DMRS may be supported.

Specifically, the location of the time-axis OFDM symbol to which the second DMRS is mapped may be determined according to at least one of the configuration, a slot type, or a slot structure of the DL/UL slot.

That is, as illustrated in FIG. 10, in the self-contained subframe structure, the location of the OFDM symbol to which the second DMRS is mapped may vary according to the guard duration and the region of the PUSCH.

For example, the self-contained subframe may have structures illustrated in FIGS. 11(a) to 11(c). That is, in the case of the self-contained subframe, the structure of the subframe may vary depending on the guard duration, and the duration of the PUCCH and PUSCH as illustrated in FIGS. 11(a) to 11(c).

As such, when the structure of the subframe is changed, if the time-axis location of the second DMRS is configured to the same location regardless of the structure of the subframe in interpolating the channel in the time domain, extrapolation duration is lengthened, and as a result, channel estimation performance may be degraded.

Accordingly, in order to estimate the channel which is changed in the time domain, the second DMRS may be variably mapped to the OFDM symbol according to the structure of the subframe.

For example, when the structure of the subframe is changed as illustrated in FIGS. 12(a) to 12(c), the location of the OFDM symbol to which the second DMRS is mapped may be differently configured according to at least one of the location of the PUCCH, the number of symbols of the PUCCH, or the symbol location of the last PDSCH.

In this case, the eNB may inform the UE of the location of the OFDM symbol to which the second DMRS is mapped through the control information or the higher layer signalling.

Specifically, the eNB transmits the location of the PUCCH, the number of symbols of the PUCCH, or the symbol location of the last PDSCH as the control information (e.g., PDCCH) indicating the information on the scheduled PDSCH to the UE.

The UE may acquire the control information by receiving the PDCCH from the eNB and recognize the location of the OFDM symbol to which the second DMRS is mapped based on the location of the PUCCH included in the control information, the number of symbols of the PUCCH, or the symbol location of the last PDSCH.

Alternatively, the eNB may transmit to the location of the OFDM symbol to which the second DMRS is mapped through the higher layer signalling and/or DCI signalling.

In this case, the eNB may define the location of the OFDM symbol to which the second DMRS may be mapped as at least one state and indicate to the UE a state configured according to the last symbol location of the PDSCH scheduled to the UE through the higher layer signalling and/or DCI signalling.

For example, when the location to which the second DMRS may be mapped is mapped to eighth, tenth, and twelfth OFDM symbols as illustrated in FIGS. 13(a) to 13(c), the eNB may define the location to which the second DMRS may be mapped as states such as C1 (l=7), C2(l=9), and C3 (l=11).

Thereafter, the eNB may indicate to the UE a state indicating the OFDM symbol location of the second DMRS configured according to the location of the PUCCH, the number of symbols of the PUCCH, or the last symbol location of the PDSCH through the higher layer signalling and/or DCI signalling as illustrated in FIGS. 12(a) to 12(c).

That is, when the location of the last symbol of the PDSCH is an eleventh (l=10) or twelfth (l=11) OFDM symbol in FIGS. 12(a) to 12(c), the second DMRS may be configured like C2 of FIG. 13(b) and when the location of the last symbol of the PDSCH is an eighth (l=7) or ninth (l=8) OFDM symbol, the second DMRS may be configured like C1 of FIG. 13(a).

The UE that receives the higher layer signalling and/or DCI signalling from the eNB may recognize the OFDM symbol to which the second DMRS is mapped through the state indicated by the higher layer signalling and/or DCI signalling.

Alternatively, the location of the symbol to which the second DMRS is mapped may be determined as a predetermined location at a transmitting/receiving side.

Specifically, the transmitting/receiving side may recognize the location of the last symbol of the PDSCH scheduled in the same slot from the PDCCH and implicitly recognize the location of the symbol to which the second DMRS is mapped from the location of the recognized symbol.

For example, when the location of the last symbol of the PDSCH recognized from the PDCCH is a thirteenth OFDM symbol or more (l=12 and 13), the second DMRS may be mapped to the location of C3 as illustrated in FIG. 13(c).

Alternatively, when the location of the last symbol of the PDSCH recognized from the PDCCH is a twelfth OFDM symbol or more (1=10 and 11), the second DMRS may be mapped to the location of C2 as illustrated in FIG. 13(b).

Alternatively, when the location of the last symbol of the PDSCH recognized from the PDCCH is the ninth or tenth OFDM symbol or more (1=8 and 9), the second DMRS may be mapped to the location of C1 as illustrated in FIG. 13(a).

Figure 14:
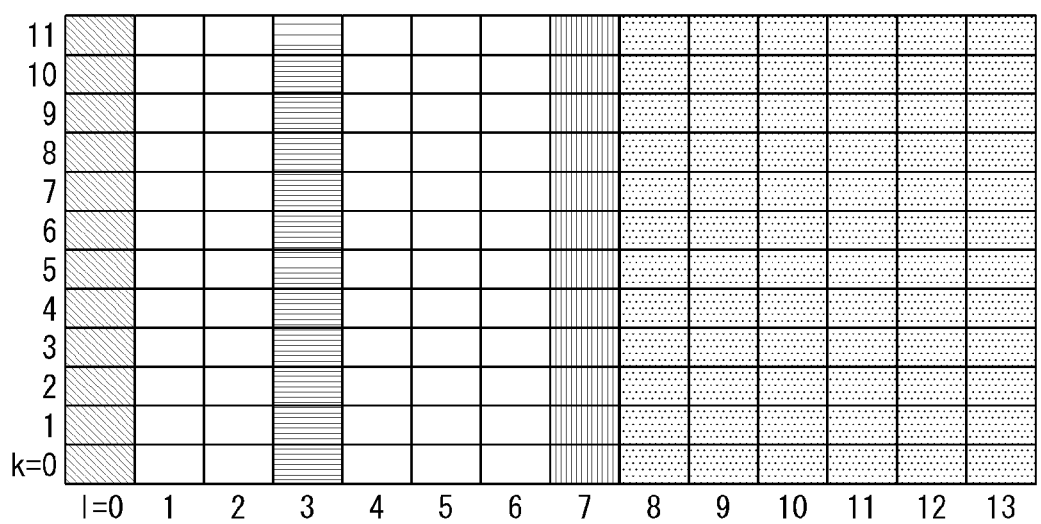
FIGS. 14 to 16 are diagrams illustrating one example of a method for determining whether to transmit a demodulation reference signal proposed by the present disclosure.
Figure 15:
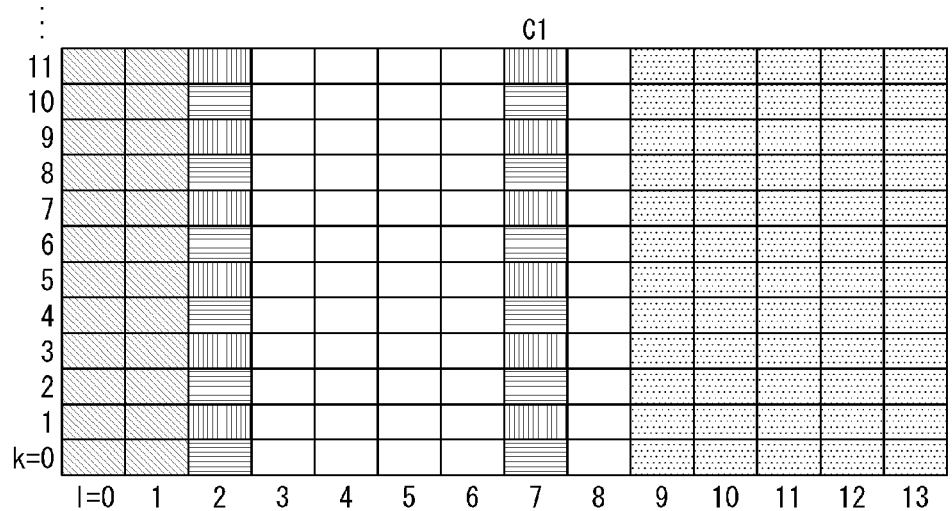
Figure 15:
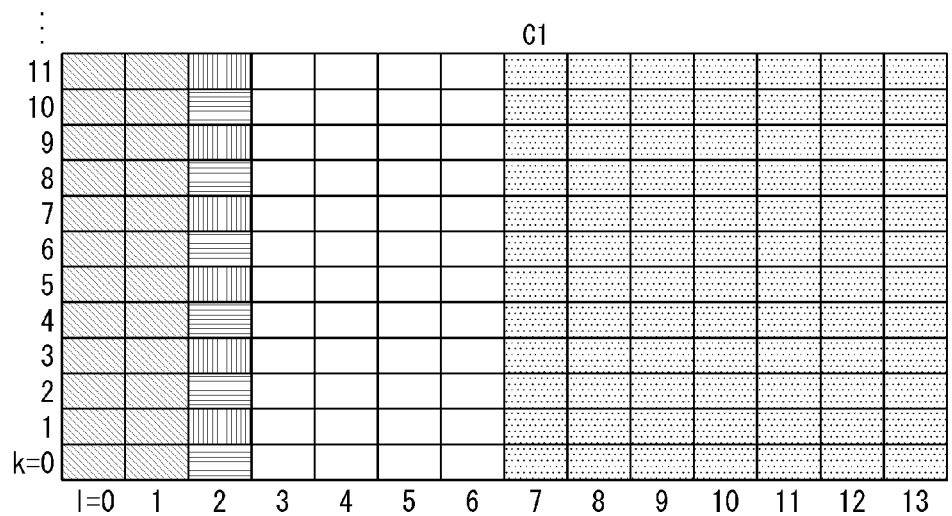
Figure 16:
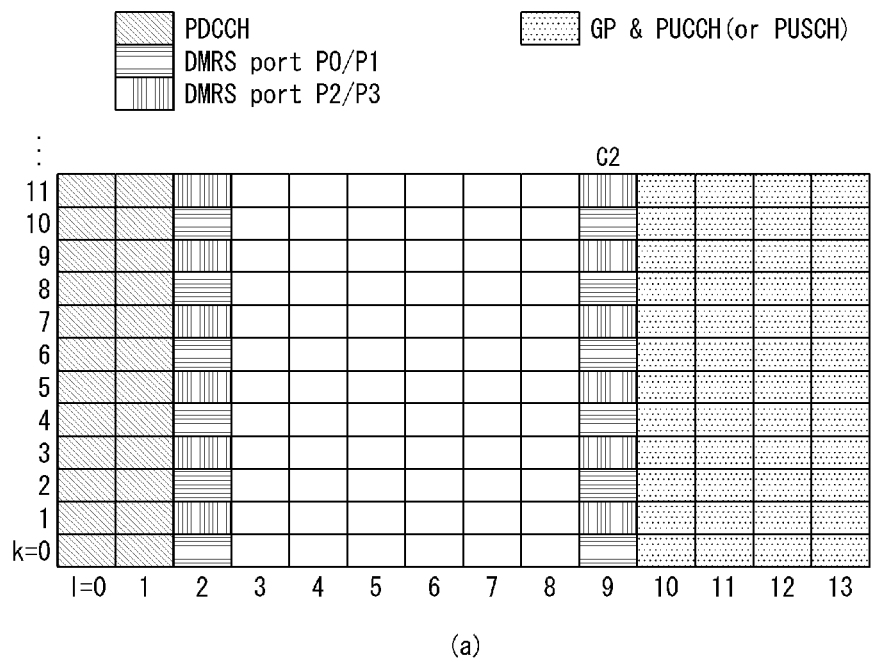
Figure 16:
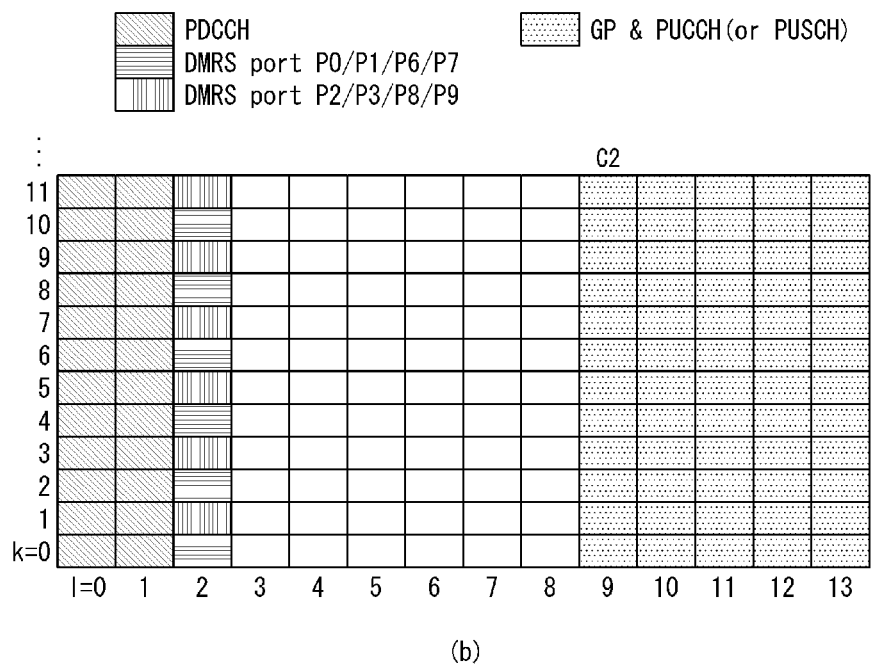

FIGS. 14 to 16 are diagrams illustrating one example of a method for determining whether to transmit a demodulation reference signal proposed by the present disclosure.

Referring to FIGS. 14 to 16, the second DMRS may be mapped to the OFDM symbol and transmitted according to the structure of the subframe in addition to the first DMRS.

Specifically, when the sum of the guard duration and the number of PUCCH symbols is equal to or larger than a specific value in the self-contained subframe structure described above as illustrated in FIG. 14, the second DMRS is not mapped.

That is, when the sum of the guard duration and the number of symbols of the PUCCH is equal to or larger than the specific value and/or OFDM symbol duration is small according to the numerology as illustrated in FIG. 14, since channel estimation of the symbols from the first DMRS is available, the additional second DMRS may not be required.

Accordingly, the eNB may not map the second DMRS to the OFDM symbol and not transmit the second DMRS in order to reduce the RS overhead due to transmission of the additional DMRS.

Alternatively, whether the second DMRS is mapped and transmitted may be determined according to the last symbol location of the PDSCH. That is, when the index of the last symbol location of the PDSCH is equal to or less than a specific index, the eNB may not map the second DMRS to the OFDM symbol and not transmit the second DMRS in order to reduce the RS overhead due to transmission of the additional DMRS.

Specifically, when the last symbol location of the PDSCH is smaller than a specific symbol index, the second DMRS configured by the higher layer may not be configured.

The location of the last symbol to which the PDSCH is mapped may be dynamically configured to the UE. On the contrary, the number of OFDM symbols to which the second DMRS is mapped may be indicated to the UE through the higher layer signalling.

The location of the last symbol may be limited so that the location of the last symbol to which the PDSCH is mapped is not dynamically configured to a location where the number of OFDM symbols to which the second DMRS indicated to the UE through the higher layer signalling is mapped may not be supported.

However, when the location of the last symbol is limited, there may be limitations on scheduling of the eNB.

Accordingly, in order to prevent the limitations, when the location of the last symbol to which the PDSCH is mapped is dynamically configured, the operation of the UE may be indicated.

That is, the second DMRS configured by the higher layer is prevented from being transmitted in a specific case, and as a result, the eNB may dynamically schedule the resource of the UE.

Alternatively, the eNB may determine the number of OFDM symbols to which the first DMRS and the second DMRS are mapped and transmitted according to the guard duration and the number (or the last symbol location of the PDSCH) of PUCCH symbols in the self-contained subframe structure.

A specific value for determining whether to map the second DMRS may be determined as the same value or different values according to the numerology and a range of a Doppler value in which the second DMRS is configured may be determined according to the number (or the last symbol location of the PDSCH) of symbols to which the PUCCH is mapped.

That is, when the subcarrier spacing is large, the duration of the OFDM symbol is reduced, and as a result, a time-varying effect due to the Doppler may be smaller than that when the subcarrier spacing is small.

Accordingly, when the subcarrier spacing is large, since time variation of the channel is not large even though only the first DMRS is used, the channel estimation performance is not significantly degraded, and as a result, the specific value may be configured to be large. In this case, since the second DMRS is not transmitted, the RS overhead is reduced, and as a result, spectral efficiency may increase.

For example, as illustrated in FIGS. 15 and 16, the specific value may be differently configured according to the subcarrier spacing.

That is, in the case of FIG. 15 in which the subcarrier spacing is 15 kHz, when the specific value is configured to 7, in the case of FIG. 16 in which the subcarrier spacing is 30 kHz, the specific value may be configured to 5.

In this case, in FIGS. 15(a) and 16(a), since the sum of the guard duration and the number of PUCCH symbols is smaller than a specific value, the second DMRS may be transmitted, but in FIGS. 15(b) and 16(a), since the sum of the guard duration and the number of PUCCH symbols is larger than the specific value, the second DMRS is not transmitted.

Table 21 below shows one example of the symbol location of the second DMRS according to the number of symbols in the guard duration and the number of symbols of the PUCCH.

TABLE 21

| Guard symbol + PUCCH symbols | 2 symbols | 3 symbols | 4 symbols | 5 symbols | 6 symbols | 7 symbols or more |
|---|---|---|---|---|---|---|
| Position of additional DMRS | 8th | 8th | 8th | x | x | x |

As still yet another embodiment of the present disclosure, in the self-contained subframe structure, the number of OFDM symbols to which the second DMRS is mapped may be configured to a predetermined number or less.

Specifically, in a non self-contained subframe, when the value of the Doppler effect is y, if the number of OFDM symbols to which the second DMRS is mapped is x, x' which is the number of OFDM symbols to which the second DMRS for the value of the same Doppler effect in the self-contained subframe is mapped may be smaller than x.

In this case, x' indicating the number of OFDM symbols to which the second DMRS is mapped in the self-contained subframe may be determined as the same value or different values according to the numerology.

The x' value may be transmitted to the UE through the higher layer signalling and/or DCI or preconfigured at the transmitting/receiving side.

Figure 17:
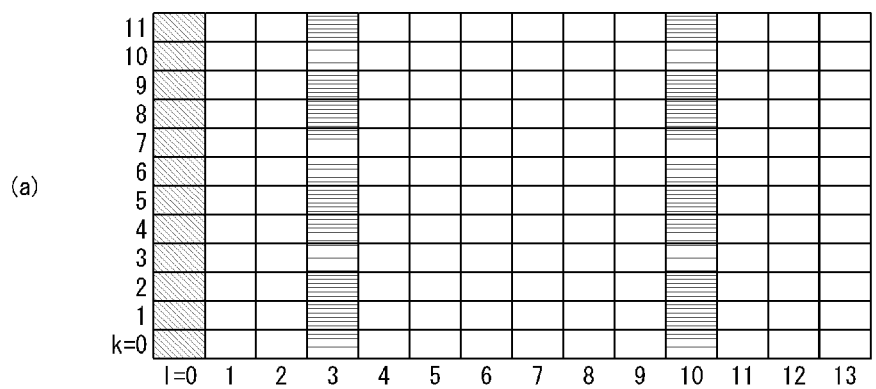
FIG. 17 is a diagram illustrating one example of a method for adjusting a density of a demodulation reference signal proposed by the present disclosure.
Figure 17:
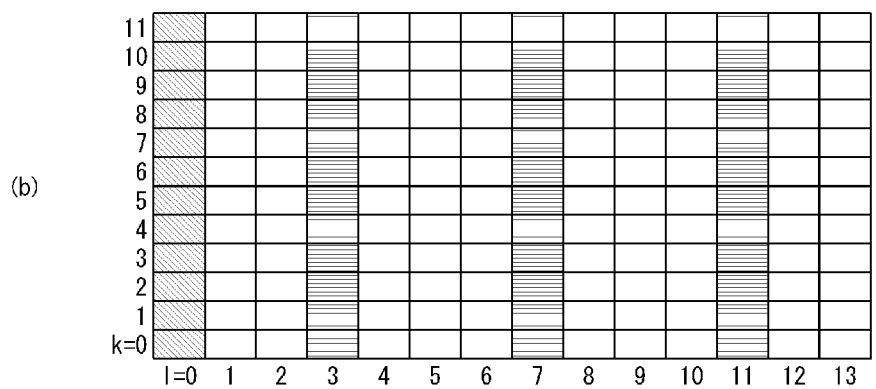
Figure 17:
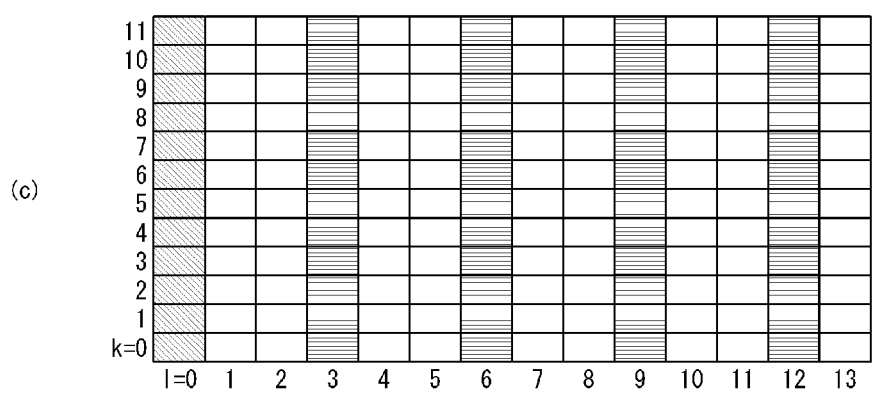

FIG. 17 is a diagram illustrating one example of a method for adjusting a density of a demodulation reference signal proposed by the present disclosure.

Referring to FIG. 17, in the non self-contained subframe structure, the location of the symbol to which the second DMRS is mapped may be differently configured according to the number of symbols to which the second DMRS is mapped.

Specifically, in the non self-contained subframe structure, the second DMRS may be additionally mapped and transmitted in addition to the first DMRS in order to prevent degradation of the channel estimation due to the Doppler effect.

In this case, the location of the OFDM symbol to which the second DMRS is mapped may vary depending on the number of OFDM symbols to which the second DMRS is mapped.

A maximum value of the number of OFDM symbols to which the second DMRS is mapped and the symbol location of the OFDM may be determined according to the numerology.

The location of the OFDM symbol to which the second DMRS is mapped may be transmitted from the eNB to the UE through the higher layer signalling and/or DCI or preconfigured at the transmitting/receiving side.

Table 22 below shows one example of the symbol location to which the second DMRS configured according to the number of OFDM symbols to which the first DMRS and the second DMRS are mapped is mapped.

TABLE 22

|  | 2 DMRS | 3 DMRS | 4 DMRS |
| --- | --- | --- | --- |
| 15 kHz | 11th | 8&12th | 7&10&13th |
| 30 kHz | 11th | 8&12th | 7&10&13th |
| 60 kHz | 11th | 8&12th | x |
| 120 kHz | 11th | 8&12th | x |

FIG. 17 illustrates one example of the OFDM symbol location of the second DMRS according to Table 21.

For example, when the first DMRS and the second DMRS are mapped to two OFDM symbols as illustrated in FIG. 17(a), the location of the second DMRS may be mapped to the eleventh OFDM symbol (l=0).

Figure 18:
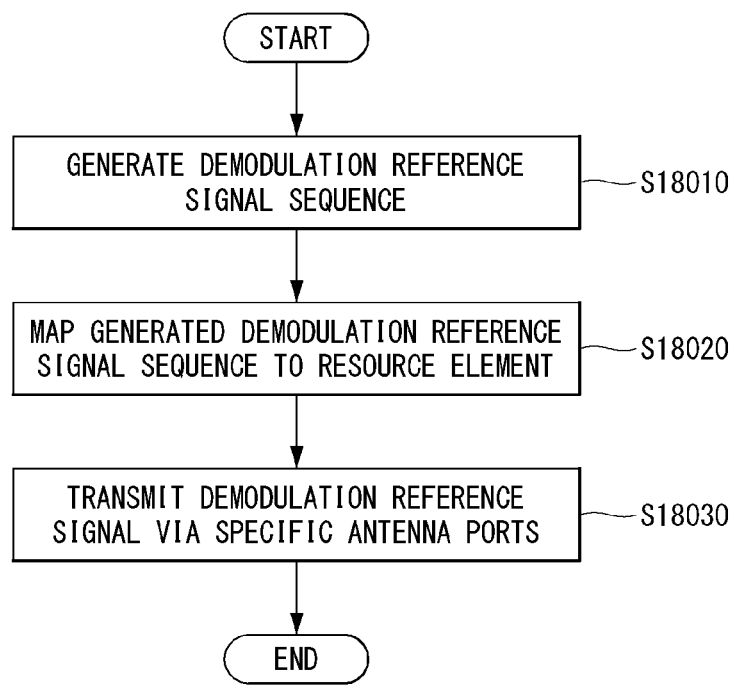
FIG. 18 is a flowchart showing one example of a method for generating and transmitting a demodulation reference signal and an additional demodulation reference signal proposed by the present disclosure.

FIG. 18 is a flowchart showing one example of a method for generating and transmitting a demodulation reference signal and an additional demodulation reference signal proposed by the present disclosure.

Referring to FIG. 18, an eNB generates a demodulation reference signal based on a pseudo random sequence (S18010). In this case, the demodulation reference signal may be the front-loaded DMRS and/or additional DMRS described above.

Thereafter, the eNB maps the generated demodulation reference signal sequence to a resource element according to transmission precoding (S18020). In this case, the demodulation reference signal sequence is mapped onto the same time axial symbol and each transmitted on a specific antenna port and the location of the time axial symbol to which the demodulation reference sequence is mapped may be determined according to a slot format or a last symbol in which downlink data is transmitted as illustrated in FIGS. 10 to 17.

Thereafter, the eNB may transmit the demodulation reference sequence mapped in a specific resource region to at least one UE by using a specific antenna port (S18030).

Figure 19:
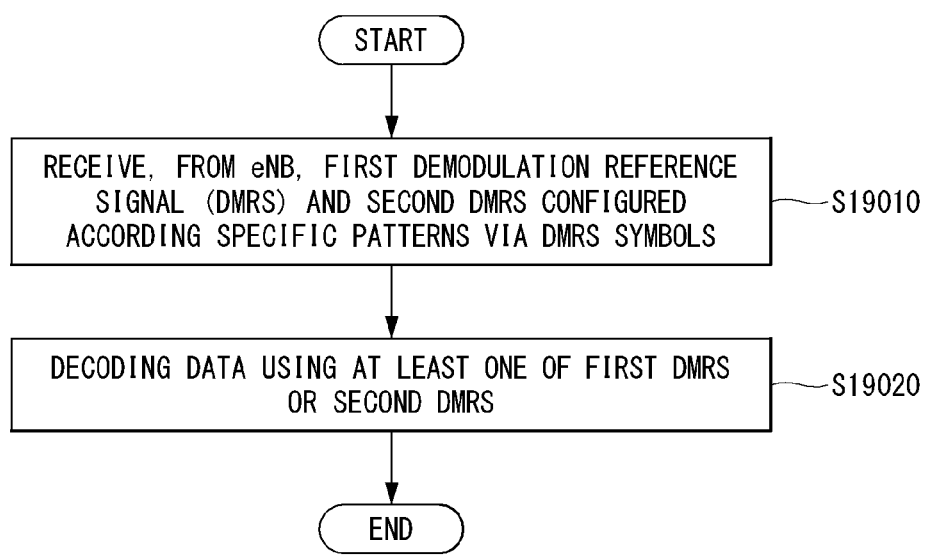
FIG. 19 is a flowchart showing one example of a method for decoding data by receiving a demodulation reference signal and an additional demodulation reference signal proposed by the present disclosure.

FIG. 19 is a flowchart showing one example of a method for decoding data by receiving a demodulation reference signal and an additional demodulation reference signal proposed by the present disclosure.

Specifically, the UE receives, from the eNB, a first Demodulation Reference Signal (DMRS) and a second DMRS configured according to a specific pattern. In this case, each of the first demodulation reference signal and the second demodulation reference signal may be transmitted on a specific antenna port and positioned on the same time axial symbol as at least one other demodulation reference signal transmitted on another antenna port and the location of the time axial symbol of the second demodulation reference signal may be determined according to the slot format or the last symbol in which the downlink data is transmitted as illustrated in FIGS. 10 to 17.

Thereafter, the UE may perform channel estimation by using at least one of the received first demodulation reference signal or second demodulation reference signal and receive data through the estimated channel and decode the data (S19020).

Figure 20:
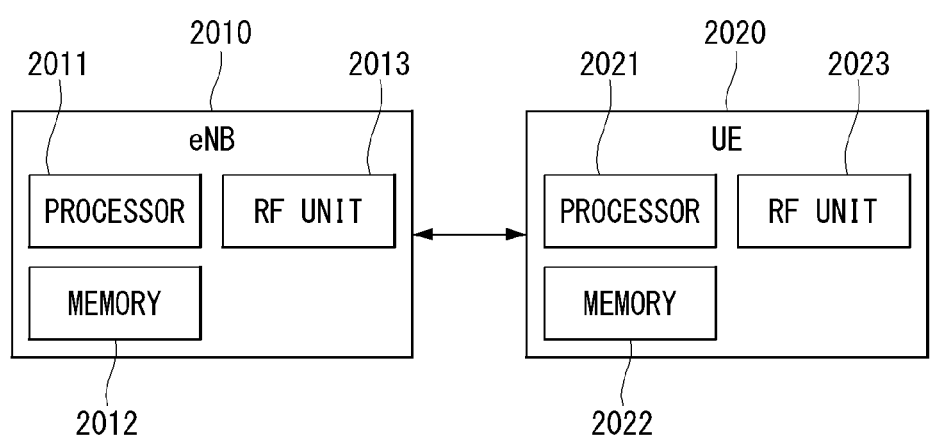
FIG. 20 is a diagram illustrating one example of an internal block diagram of a wireless apparatus to which the present disclosure may be applied.

FIG. 20 is a diagram illustrating one example of an internal block diagram of a wireless apparatus to which the present disclosure may be applied.

Here, the wireless device may be an eNB and a UE and the eNB includes both a macro eNB and a small eNB.

As illustrated in FIG. 20, the eNB 2010 and the UE 2020 include communication units (a transceiving unit 2013 and an RF 2023), processors 2011 and 2021, and memories 2012 and 2022.

Besides, the eNB and the UE may further include an input unit and an output unit.

The communication units 2013 and 2023, the processors 2011 and 2021, the input unit, the output unit, and the memories 2012 and 2022 are functionally connected to perform the method proposed by the present disclosure.

Upon receiving information generated from a physical (PHY) layer protocol, the communication units (the transceiving unit 2013 and the RF unit 2023) move the received information to a radio-frequency (RF) spectrum and perform filtering, amplification, and the like and transmit the information through an antenna. Further the communication units perform a function to move a radio frequency RF) signal received by the antenna to a band that may be processed by a PHY layer protocol and perform filtering.

In addition, the communication units may also include a switch function for switching transmission and reception functions.

The processors 2011 and 2021 implement a function, a process, and/or a method which are proposed in the present disclosure. Layers of a radio interface protocol may be implemented by the processor.

The processor may be expressed as a control section, a controller, a control unit, a computer, and the like.

The memories 2012 and 2022 are connected to the processor to store a protocol or a parameter for performing the uplink resource allocation method.

The processors 2011 and 2021 may include an application-specific integrated circuit (ASIC), another chipset, a logic circuit, and/or a data processing apparatus. The memory may include a read-only memory (ROM), a random access memory (RAM), a flash memory, a memory card, a storage medium, and/or other storage devices. The communication unit may include a baseband circuit for processing the radio signal. When the embodiment is implemented by software, the aforementioned technique may be implemented by a module (a process, a function, and the like) that performs the aforementioned function.

The module may be stored in the memory and executed by the processor. The memory may be positioned inside or outside the processor and connected with the processor by various well-known means.

An output unit (display section or display unit) is controlled by the processor, and outputs information output from the processor together with a key input signal generated by a key input unit various information signals from the processor.

Furthermore, although the drawings have been described for the sake of convenience of explanation, it is also possible to design a new embodiment to be implemented by merging the embodiments described in each drawing. In addition, it is also within the scope of the present disclosure to design a computer-readable recording medium in which a program for executing the previously described embodiments is recorded according to the needs of those skilled in the art.

Configurations and methods of the described embodiments may not be limitedly applied to the method according to the present disclosure, but all or some of the respective embodiments may be selectively combined and configured so as to be variously modified.

Meanwhile, the method of the present disclosure may be implemented as a processor readable code in a processor readable recording medium provided in a network device. The processor readable recording medium includes all kinds of recording devices storing data which may be deciphered by a processor. Examples of the processor readable recording medium include a ROM, a RAM, a CD-ROM, a magnetic tape, a floppy disk, an optical data storage device, and the like and further include a device implemented as a type of a carrier wave such as transmission through the Internet. Further, the processor readable recording media may be stored and executed as codes which may be distributed in the computer system connected through a network and read by the processor in a distribution method.

Further, although the embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

In addition, in the present disclosure, both the invention of the object and the invention of the method are described and the description of both inventions may be supplemented as necessary.

INDUSTRIAL APPLICABILITY

An example in which in the wireless communication system of the present disclosure, the RRC connection method is applied to the 3GPP LTE/LTE-A system is described primarily, but it is possible to apply the RRC connection method to various wireless communication systems in addition to the 3GPP LTE/LTE-A system.

What is claimed is:

1. A method of receiving, by a terminal, a demodulation reference signal (DMRS) in a wireless communication system, the method comprising:

receiving, from a base station, downlink control information (DCI) for scheduling physical downlink shared channel (PDSCH); and receiving, from the base station, a first demodulation reference signal (DMRS) for the PDSCH based on a DMRS configuration type, wherein a number of one or more symbols of the first DMRS and one or more antenna ports of the first DMRS are informed by the DCI, wherein, based on a second DMRS for the PDSCH being configured, a location of one or more symbols of the second DMRS is determined based on a last symbol on which the PDSCH is transmitted, wherein the location of the one or more symbols of the second DMRS is configured differently according to a number of symbols of the first DMRS and the second DMRS, and wherein the second DMRS is configured according to a first value indicating the number of first symbols for inter-symbol interference and a second value indicating the number of second symbols for transmitting uplink control information.

2. The method of claim 1, wherein when the sum of the first value and the second value is larger than a specific value, the second DMRS is not configured.

3. The method of claim 1, wherein when the sum of the first value and the second value is smaller than the specific value, the second DMRS is configured in the one or more symbols of the second DMRS.

4. The method of claim 1, wherein in a subframe in which the first DMRS and the second DMRS are configured, resources for uplink and downlink are configured.

5. The method of claim 1,
wherein the DCI includes format information indicating the slot format and location information indicating the location of the last symbol.

6. The method of claim 1, further comprising:
receiving, from the base station, a signal indicating the location of the one or more symbols of the second DMRS.

7. The method of claim 1, wherein the location of the one or more symbols of the second DMRS is configured in the base station and the terminal according to a preconfigured specific value, and
wherein the specific value is configured according to a first symbol for inter-symbol interference and a second symbol for transmitting an uplink data.

8. The method of claim 1, wherein whether or not the second DMRS is transmitted is determined based on the last symbol on which the PDSCH is transmitted.

9. A terminal for receiving a demodulation reference signal (DMRS) in a wireless communication system, the terminal comprising:

a transceiver for transmitting and receiving a radio signal; and a processor for controlling the transceiver, wherein the processor is configured to:

receive, from a base station, downlink control information (DCI) for scheduling physical downlink shared channel (PDSCH); and receive, from the base station, a first demodulation reference signal (DMRS) for the PDSCH based on a DMRS configuration type, wherein a number of one or more symbols of the first DMRS and one or more antenna ports of the first DMRS are informed by the DCI, wherein based on a second DMRS for the PDSCH being configured, a location of one or more symbols of the second DMRS is determined based on the last symbol on which the PDSCH is transmitted, wherein the location of the one or more symbols of the second DMRS is configured differently according to a number of symbols of the first DMRS and the second DMRS, and wherein the second DMRS is configured according to a first value indicating the number of first symbols for inter-symbol interference and a second value indicating the number of second symbols for transmitting uplink control information.

10. The terminal of claim 9, wherein when the sum of the first value and the second value is larger than a specific value, the second DMRS is not configured.

11. The terminal of claim 9, wherein when the sum of the first value and the second value is smaller than the specific value, the second DMRS is configured in the one or more symbols of the second DMRS.

12. The terminal of claim 9, wherein in a subframe in which the first DMRS and the second DMRS are configured, resources for uplink and downlink are configured.

13. The terminal of claim 9,
wherein the DCI includes format information indicating the slot format and location information indicating the location of the last symbol.

14. The terminal of claim 9, wherein the processor receives, from the base station, a signal indicating the location of the one or more symbols of the second DMRS.

15. The terminal of claim 9,
wherein the location of the one or more symbols of the second DMRS is configured in the base station and the terminal according to a preconfigured specific value, and wherein the specific value is configured according to a first symbol for inter-symbol interference and a second symbol for transmitting an uplink data.

16. The terminal of claim 9, wherein whether or not the second DMRS is transmitted is determined based on the last symbol on which the PDSCH is transmitted.

17. A method of transmitting a demodulation reference signal (DMRS), by a base station, in a wireless communication system, the method comprising:
transmitting, to a terminal, downlink control information (DCI) for scheduling physical downlink shared channel (PDSCH); and
transmitting, to the terminal, a first DMRS for the PDSCH based on a DMRS configuration type, wherein a number of one or more symbols of the first DMRS and one or more antenna ports of the first DMRS are informed by the DCI, wherein based on a second DMRS for the PDSCH being configured, a location of one or more symbols of the second DMRS is determined based on a last symbol on which the PDSCH is transmitted, wherein the location of the one or more symbols of the second DMRS is configured differently according to a number of symbols of the first DMRS and the second DMRS, and wherein the second DMRS is configured according to a first value indicating the number of first symbols for inter-symbol interference and a second value indicating the number of second symbols for transmitting uplink control information.

18. A base station for transmitting a demodulation reference signal (DMRS) in a wireless communication system, the base station comprising:
a transceiver for transmitting and receiving a radio signal; and
a processor for controlling the transceiver,
wherein the processor is configured to:
transmit, to a terminal, downlink control information (DCI) for scheduling physical downlink shared channel (PDSCH); and
transmit, to the terminal, a first DMRS for the PDSCH based on a DMRS configuration type,
wherein a number of one or more symbols of the first DMRS and one or more antenna ports of the first DMRS are informed by the DCI,
wherein based on a second DMRS for the PDSCH being configured, a location of one or more symbols of the second DMRS is determined based on a last symbol on which the PDSCH is transmitted,
wherein the location of the one or more symbols of the second DMRS is configured differently according to a number of symbols of the first DMRS and the second DMRS, and
wherein the second DMRS is configured according to a first value indicating the number of first symbols for inter-symbol interference and a second value indicating the number of second symbols for transmitting uplink control information.

* * * * *